United States Patent
Sostar

(10) Patent No.: US 12,038,028 B2
(45) Date of Patent: Jul. 16, 2024

(54) SET OF PANELS, A METHOD FOR ASSEMBLY OF THE SAME, AND A LOCKING DEVICE FOR A FURNITURE PRODUCT

(71) Applicant: Välinge Innovation AB, Viken (SE)

(72) Inventor: Marko Sostar, Helsingborg (SE)

(73) Assignee: Välinge Innovation AB, Viken (SE)

( * ) Notice: Subject to any disclaimer, the term of this patent is extended or adjusted under 35 U.S.C. 154(b) by 242 days.

(21) Appl. No.: 17/514,055

(22) Filed: Oct. 29, 2021

(65) Prior Publication Data
US 2022/0228615 A1   Jul. 21, 2022

(30) Foreign Application Priority Data

Jan. 19, 2021  (SE) .................................... 2150050-9
Jan. 20, 2021  (SE) .................................... 2150058-2

(51) Int. Cl.
*F16B 12/20*  (2006.01)

(52) U.S. Cl.
CPC .. *F16B 12/2027* (2013.01); *F16B 2012/2045* (2013.01); *F16B 2012/209* (2013.01)

(58) Field of Classification Search
CPC ................ Y10S 403/12; F16B 12/2009; F16B 12/2027; F16B 2012/209; F16B 5/008; F16B 2012/2018; F16B 2012/2045; A47B 2230/06
See application file for complete search history.

(56) References Cited

U.S. PATENT DOCUMENTS

| | | | | |
|---|---|---|---|---|
| 182,141 A | * | 9/1876 | Wilson | E05C 3/046 292/342 |
| 1,149,488 A | * | 8/1915 | Arndt | E05C 3/046 292/240 |
| 1,783,150 A | * | 11/1930 | Jeffery | E05C 3/042 292/213 |

(Continued)

FOREIGN PATENT DOCUMENTS

CH  705082 A2 * 12/2012 .......... F16B 12/2009
CN  212455095 U * 2/2021

(Continued)

OTHER PUBLICATIONS

U.S. Appl. No. 15/642,757, filed Jul. 6, 2017, Peter Derelöv, (Cited herein as US Patent Application Publication No. 2017/0298973 A1 of Oct. 19, 2017).

(Continued)

*Primary Examiner* — Matthew R McMahon
(74) *Attorney, Agent, or Firm* — Boone IP Law

(57) ABSTRACT

A set for a furniture product includes a panel, an adjacent panel and a locking device. The panel includes a groove and at least one hole connected to the groove via an opening. The adjacent panel includes a first edge that is configured to be arranged in the groove of the panel. The locking device is configured to lock the first edge of the adjacent panel in the groove of the panel. The locking device includes a cylinder and a lever connected to the cylinder. The cylinder is configured to be arranged in the hole in the panel. The cylinder is configured to be displaceable in the hole between a first mounting position and a second locking position by rotation of the cylinder.

28 Claims, 11 Drawing Sheets

(56) References Cited

U.S. PATENT DOCUMENTS

| | | | |
|---|---|---|---|
| 4,549,831 A * | 10/1985 | Lautenschlager, Jr. ...................... F16B 12/2027 52/285.3 | |
| 4,695,030 A * | 9/1987 | Fischer ................ H02B 1/042 248/507 | |
| 4,756,637 A * | 7/1988 | Walz .................. F16B 12/2027 403/231 | |
| 4,813,726 A * | 3/1989 | Ravinet ................ A47B 95/00 292/241 | |
| 8,887,468 B2 | 11/2014 | Håkansson et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,781,997 B2 * | 10/2017 | Maertens .......... E04F 15/02038 | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,669,716 B2 | 6/2020 | Derelöv | |
| 10,670,064 B2 | 6/2020 | Derelöv | |
| 10,724,564 B2 | 7/2020 | Derelöv | |
| 10,731,688 B2 | 8/2020 | Brännström et al. | |
| 10,736,416 B2 | 8/2020 | Derelöv et al. | |
| 10,830,266 B2 | 11/2020 | Fridlund | |
| 10,830,268 B2 | 11/2020 | Boo | |
| 10,871,179 B2 | 12/2020 | Håkansson et al. | |
| 10,876,562 B2 | 12/2020 | Pervan | |
| 10,876,563 B2 | 12/2020 | Derelöv et al. | |
| 10,968,936 B2 | 4/2021 | Boo et al. | |
| 11,076,691 B2 | 8/2021 | Boo | |
| 11,083,287 B2 | 8/2021 | Boo et al. | |
| 11,098,484 B2 | 8/2021 | Derelöv | |
| 11,137,007 B2 | 10/2021 | Fridlund | |
| 11,204,051 B2 | 12/2021 | Brännström et al. | |
| 11,246,415 B2 | 2/2022 | Derelöv et al. | |
| 11,272,783 B2 * | 3/2022 | Derelöv ................ F16B 12/24 | |
| 11,326,636 B2 | 5/2022 | Pervan | |
| 11,371,542 B2 * | 6/2022 | Derelöv .............. F16B 12/2027 | |
| 2012/0279161 A1 | 11/2012 | Håkansson et al. | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2016/0007751 A1 | 1/2016 | Derelöv | |
| 2016/0174704 A1 | 6/2016 | Boo et al. | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |
| 2018/0080488 A1 | 3/2018 | Derelöv | |
| 2018/0087552 A1 | 3/2018 | Derelöv et al. | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0328396 A1 | 11/2018 | Fransson et al. | |
| 2019/0085886 A1 | 3/2019 | Davis et al. | |
| 2019/0113061 A1 | 4/2019 | Håkansson et al. | |
| 2019/0166989 A1 | 6/2019 | Boo et al. | |
| 2019/0191870 A1 | 6/2019 | Derelöv | |
| 2019/0195256 A1 * | 6/2019 | Derelöv .............. F16B 12/2027 | |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 | 1/2020 | Brännström et al. | |
| 2020/0055126 A1 | 2/2020 | Fridlund | |
| 2020/0069048 A1 | 3/2020 | Derelöv et al. | |
| 2020/0069049 A1 | 3/2020 | Derelöv et al. | |
| 2020/0102978 A1 | 4/2020 | Fridlund | |
| 2020/0121076 A1 | 4/2020 | Derelöv et al. | |
| 2020/0214447 A1 | 7/2020 | Derelöv et al. | |
| 2020/0300284 A1 | 9/2020 | Pervan | |
| 2020/0337455 A1 | 10/2020 | Boo et al. | |
| 2020/0340513 A1 | 10/2020 | Derelöv | |
| 2021/0079650 A1 | 3/2021 | Derelöv | |
| 2021/0148392 A1 | 5/2021 | Brännström et al. | |
| 2021/0180630 A1 | 6/2021 | Bruno et al. | |
| 2021/0190112 A1 | 6/2021 | Derelöv | |
| 2021/0207635 A1 | 7/2021 | Håkansson et al. | |
| 2021/0222716 A1 | 7/2021 | Derelöv et al. | |
| 2021/0262507 A1 | 8/2021 | Svensson et al. | |
| 2021/0262508 A1 | 8/2021 | Svensson et al. | |
| 2021/0276108 A1 | 9/2021 | Derelöv et al. | |
| 2021/0285480 A1 | 9/2021 | Derelöv et al. | |
| 2021/0381251 A1 | 12/2021 | Svensson | |
| 2022/0018373 A1 | 1/2022 | Boo | |
| 2022/0049735 A1 | 2/2022 | Meijer | |
| 2022/0186761 A1 | 6/2022 | Derelöv et al. | |
| 2022/0252097 A1 * | 8/2022 | Rydsjö .................. F16B 12/10 | |
| 2023/0167840 A1 * | 6/2023 | Chen .................. F16B 12/2027 403/231 | |

FOREIGN PATENT DOCUMENTS

| | | | |
|---|---|---|---|
| DE | 4229115 A1 * | 3/1993 | .......... F16B 12/2009 |
| EP | 3663595 A1 | 6/2020 | |
| GB | 2598400 A * | 3/2022 | .......... F16B 12/2027 |
| WO | 2012/089015 A1 | 7/2012 | |
| WO | WO 2014/072080 A1 | 5/2014 | |

OTHER PUBLICATIONS

U.S. Appl. No. 15/956,949, filed Apr. 19, 2018, Peter Derelöv, (Cited herein as US Patent Application Publication No. 2019/0323535 A1 of Oct. 24, 2019).

U.S. Appl. No. 15/978,630, filed May 14, 2018, Jonas Fransson, Niclas Håkansson and Agne Pålsson, (Cited herein as US Patent Application Publication No. 2018/0328396 A1 of Nov. 15, 2018).

U.S. Appl. No. 16/220,574, filed Dec. 14, 2018, Peter Derelöv, (Cited herein as US Patent Application Publication No. 2019/0195256 A1 of Jun. 27, 2019).

U.S. Appl. No. 16/386,874, filed Apr. 17, 2019, Peter Derelöv, (Cited herein as US Patent Application Publication No. 2019/0323534 A1 of Oct. 24, 2019).

U.S. Appl. No. 16/663,603, filed Oct. 25, 2019, Magnus Fridlund, (Cited herein as US Patent Application Publication No. 2020/0055126 A1 of Feb. 20, 2020).

U.S. Appl. No. 16/722,096, filed Dec. 20, 2019, Peter Derelöv and Christian Boo, (Cited herein as US Patent Application Publication No. 2020/0121076 A1 of Apr. 23, 2020).

U.S. Appl. No. 16/951,394, filed Nov. 18, 2020, Niclas Håkansson and Darko Pervan, (Cited herein as US Patent Application Publication No. 2021/0207635 A1 of Jul. 8, 2021).

U.S. Appl. No. 16/953,608, filed Nov. 20, 2020, Peter Derelöv, Hans Brännström and Agne Pålsson, (Cited herein as US Patent Application Publication No. 2021/0285480 A1 of Sep. 16, 2021).

U.S. Appl. No. 17/119,392, filed Dec. 11, 2020, Jimmie Bruno and Zoran Simunic, (Cited herein as US Patent Application Publication No. 2021/0180630 A1 of Jun. 17, 2021).

(56) References Cited

OTHER PUBLICATIONS

U.S. Appl. No. 17/126,518, filed Dec. 18, 2020, Peter Derelöv, (Cited herein as US Patent Application Publication No. 2021/0190112 A1 of Jun. 24, 2021).

U.S. Appl. No. 17/398,416, filed Aug. 10, 2021, Thomas Meijer, (Cited herein as US Patent Application Publication No. 2022/0049735 A1 of Feb. 17, 2022).

U.S. Appl. No. 17/524,293, filed Nov. 11, 2021, Hans Brännström, Agne Pålsson and Peter Derelöv.

U.S. Appl. No. 17/546,356, filed Dec. 9, 2021, Peter Derelöv and Hans Brännström, (Cited herein as US Patent Application Publication No. 2022/0186761 A1 of Jun. 16, 2022).

U.S. Appl. No. 17/556,146, filed Dec. 20, 2021, Christian Boo.

U.S. Appl. No. 17/665,160, filed Feb. 4, 2022, Oscar Rydsjö, Marko Sostar and Patrik Carlsson.

Brännström, Hans, et al., U.S. Appl. No. 17/524,293 entitled "Assembled Product and a Method of Assembling the Assembled Product," filed Nov. 11, 2021.

Boo, Christian, U.S. Appl. No. 17/556,146 entitled "Wedge-shaped Tongue Groove," filed Dec. 20, 2021.

Rydsjö, Oscar, U.S. Appl. No. 17/665,160 entitled "Mounting Bracket," filed Feb. 4, 2022.

U.S. Appl. No. 17/869,911, filed Jul. 21, 2022, Niclas Håkansson and Darko Pervan.

Meijer, U.S. Appl. No. 17/847,655 entitled "Panels Comprising a Mechanical Locking Device and an Associated Assembled Article", filed Jun. 23, 2022.

Håkansson et al., U.S. Appl. No. 17/869,911 entitled "Mechanical Locking System for Building Panels", filed Jul. 21, 2022.

International Preliminary Report on Patentability received for PCT Patent Application No. PCT/SE21/051086, mailed on Aug. 3, 2023, 6 pages.

International Search Report and Written Opinion received for PCT Patent Application No. PCT/SE2021/051086, mailed on Jan. 21, 2022, 9 pages.

U.S. Appl. No. 17/398,416, filed Aug. 10, 2021, Thomas Meijer.
U.S. Appl. No. 17/665,160, filed Feb. 4, 2022, Oscar Rydsjö.
U.S. Appl. No. 17/847,655, filed Jun. 23, 2022, Thomas Meijer.
U.S. Appl. No. 17/784,341, filed Jun. 10, 2022, Johan Svensson.
U.S. Appl. No. 17/870,215, filed Jul. 21, 2022, Peter Derelöv.
U.S. Appl. No. 17/959,010, filed Oct. 3, 2022, Mindaugas Zacharenko.
U.S. Appl. No. 18/058,037, filed Nov. 22, 2022, Peter Derelöv.
U.S. Appl. No. 18/191,404, filed Mar. 28, 2023, Thomas Meijer.
U.S. Appl. No. 18/239,924, filed Aug. 30, 2023, Niclas Håkansson.
U.S. Appl. No. 18/422,368, filed Jan. 25, 2024, Christian Boo.
U.S. Appl. No. 18/422,425, filed Jan. 25, 2024, Christian Boo.
U.S. Appl. No. 18/440,330, filed Feb. 13, 2024, Thomas Meijer.
U.S. Appl. No. 18/441,480, filed Feb. 14, 2024, Peter Derelöv.

\* cited by examiner

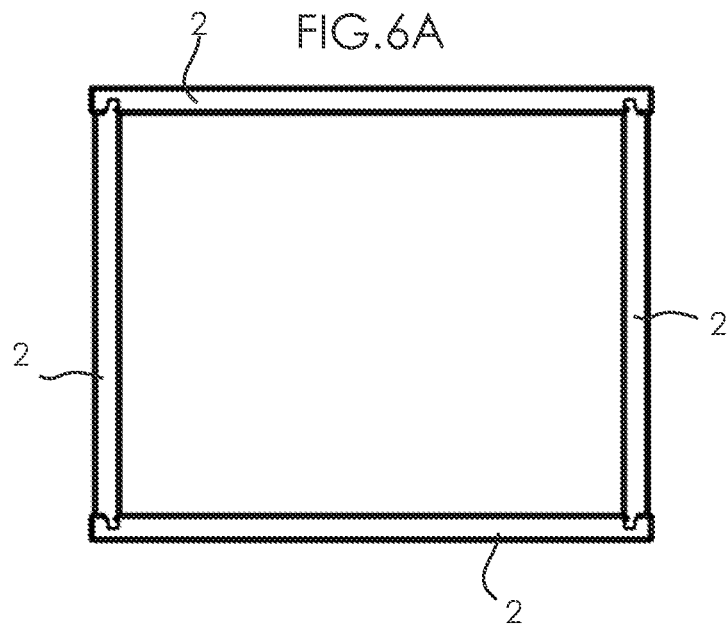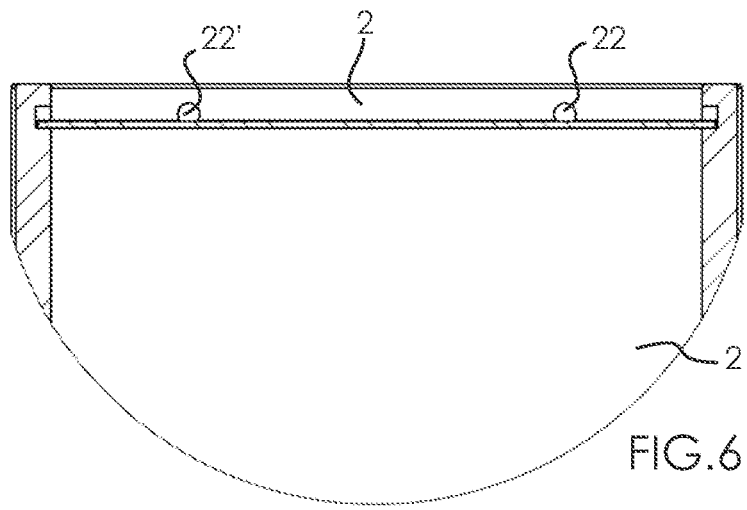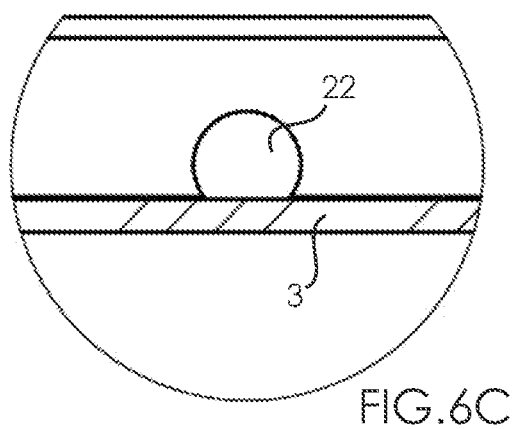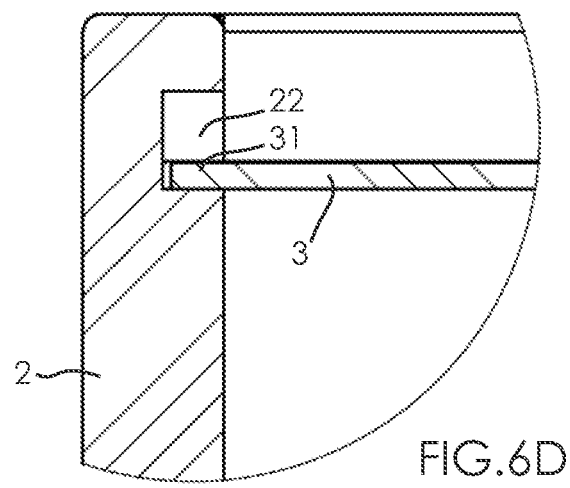

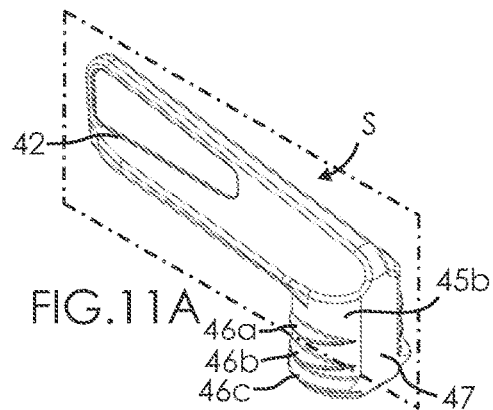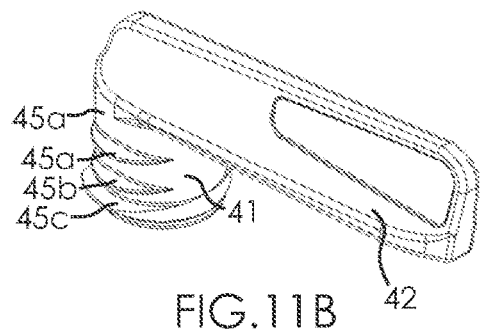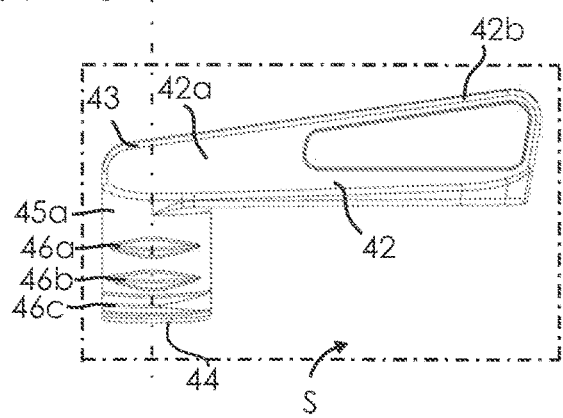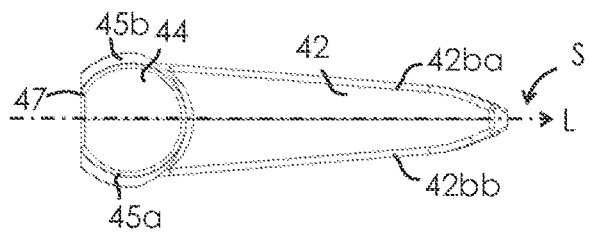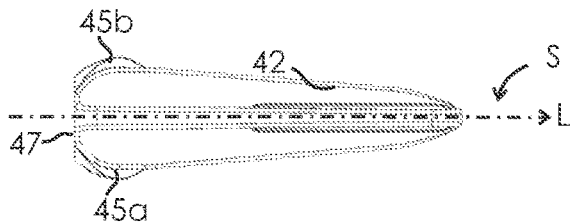

SET OF PANELS, A METHOD FOR ASSEMBLY OF THE SAME, AND A LOCKING DEVICE FOR A FURNITURE PRODUCT

CROSS REFERENCE TO RELATED APPLICATIONS

The present application claims the benefit of Swedish Application No. 2150058-2, filed on 20 Jan. 2021 and Swedish Application No. 2150050-9, filed on 19 Jan. 2021. The entire contents of each of Swedish Application No. 2150058-2 and Swedish Application No. 2150050-9 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component.

BACKGROUND

A furniture product provided with a mechanical locking device is known in the art, as disclosed in WO 2014/072080. The furniture product comprises a first panel connected perpendicular to a second panel by a mechanical locking device comprising a flexible tongue in an insertion groove and a pin that is inserted into the mechanical locking device to move the flexible tongue.

Embodiments of the present invention address a need to provide an easier assembling and/or an increased locking strength of the panels.

SUMMARY

It is an object of at least certain embodiments and aspects of the present invention to provide an improvement over the above described techniques and known art.

A further object of at least certain aspects of the present invention is to facilitate assembling of panels configured to be assembled without the need of using any tools.

A further object of at least certain aspects of the present invention is to facilitate disassembling of panels configured to be assembled and disassembling without the need of tools.

A further object of at least certain aspects of the present invention is to facilitate assembling of panels configured to be assembled with a locking device that is easy to manufacture and to use.

A further object of at least certain aspects of the present invention is to facilitate assembling of panels configured to be assembled with a locking device that is in one piece.

At least some of these and other objects and advantages that may be apparent from the description have been achieved by a first aspect: a locking device for a furniture product comprising a panel comprising a groove and at least one hole connected to the groove via an opening, and an adjacent panel comprising a first edge that is configured to be arranged in the groove of the panel. The locking device is configured to lock the first edge of the adjacent panel in the groove of the panel. The locking device comprises a cylinder and a lever connected to the cylinder. The cylinder is configured to be arranged in the hole in the panel. The cylinder is configured to be displaceable in said hole between a first mounting position and a second locking position by means of rotation of said cylinder.

In one embodiment, the cylinder comprises a first locking surface configured to engage with the adjacent panel by means of a clockwise rotation of said cylinder for locking the adjacent panel to the panel.

The cylinder may preferably comprise a second locking surface configured to engage with said adjacent panel by means of a counter-clockwise rotation of said cylinder for locking the adjacent panel to the panel.

Further embodiments of the locking device being described below in relation to the second aspect.

At least some of these and other objects and advantages that may be apparent from the description have been achieved by a second aspect: a set of panels, preferably for a furniture product, comprising a panel, an adjacent panel and a locking device. The panel comprises a groove and at least one hole connected to the groove via an opening. The adjacent panel comprises a first edge that is configured to be arranged in the groove of the panel. The locking device is configured to lock the first edge of the adjacent panel in the groove of the panel. The locking device comprises a cylinder and a lever connected to the cylinder. The cylinder is configured to be arranged in the hole in the panel. The cylinder is configured to be displaceable in said hole between a first mounting position and a second locking position by means of rotation of said cylinder.

In one embodiment, the cylinder comprises a first locking surface configured to engage with the adjacent panel by means of a clockwise rotation of said cylinder for locking the adjacent panel to the panel.

The cylinder may preferably comprise a second locking surface configured to engage with said adjacent panel by means of a counter-clockwise rotation of said cylinder for locking the adjacent panel to the panel.

By a set of panels in accordance to this the adjacent panel and the panel could be locked to each other in an effective way and in an easy way. The eccentric cylinder exerts a force to the adjacent panel that locks the adjacent panel and the panel together in a good way. Embodiments of the locking device do not need any tools to be used. Further, the locking device may be a single piece that is easy to use. Further, by only having a single piece locking device the manufacturing of the locking device could be made in one step and thus reduce the cost for the locking device. Embodiments of the set of panels may involve the advantage that the adjacent panel does not need to be machined in a specific manner to be able to interact with the locking device.

In one embodiment, the locking device comprises a plane, preferably being a plane of symmetry, wherein the first locking surface is provided on a first side of said plane and the second locking surface is provided on an opposite second side of said plane.

The said plane may preferably be a centre plane of the locking device.

The cylinder may comprise an essentially planar surface configured to be arranged adjacent and/or facing the opening in said first mounting position, preferably said planar surface is orthogonal the said plane and the bottom base.

In one embodiment, each locking surface comprises at least two, preferably three ridges protruding in a radial direction from the cylinder.

The cylinder, excluding the planar surface and the ridges, may have a circular cross section and an elliptical cross section including the ridges.

The lever may extend from an inner end to an outer end in a direction substantially transverse the planar surface.

In one embodiment, the said plane is configured to be arranged substantially orthogonal the adjacent panel and the panel in the mounting position.

The plane may be orthogonal the planar surface and a bottom base of the cylinder.

In one embodiment, the cylinder comprises at least one cross-section portion parallel the planar surface being configured to lock the first edge of the adjacent panel in the groove by means of any of a clockwise rotation of the cylinder and a counter-clockwise rotation of the cylinder initiated in the mounting position.

The hole and the first edge may form a D-shape when the first edge is configured in said groove.

In one embodiment, the cylinder comprises a first width and a second width in a plane transverse a longitudinal centre axis of the cylinder, the first width being parallel the planar surface and a second width transverse the planar surface.

The first width of the cylinder may be equal or less than the first width of the hole and exceed a sum of the first width of the hole minus the height of a circular segment of hole by which the hole extends into the groove.

The ridges may extend discontinuously along a circumference of the cylinder.

In one embodiment, the ridges are essentially non-helical.

One or more of said ridges, preferably a most distal ridge, may extend directly contiguous with said planar surface such that said planar surface is at least partially formed in at least one of said ridges.

In one embodiment, one or more of said ridges are separated said planar surface along a circumference of the cylinder such that said planar surface is not formed said ridges.

At least a portion of an inner circumferential surface of the cylinder extending from the planar surface, or between the planar surfaces, may comprise a constant radius.

In one embodiment, the locking device is configured to obtain said mounting position by means of arranging said planar surface facing said adjacent panel.

The locking device may be configured to obtain said mounting position by means of displacement of the cylinder along its longitudinal axis into said hole while not rotating the cylinder.

In one embodiment, the planar surface forms a single D cross-section.

The planar surface and the adjacent panel form a vertical plane in the mounting position.

In one embodiment, the cylinder is configured such that, the extension of the cylinder in a direction transverse the opening is increased in response to rotation of the cylinder initiated in said mounting position.

The adjacent panel and the hole form a D-shaped cross-section.

In one embodiment, a most distal and/or bottom ridge comprises a greater volume than one or more proximal ridges.

A first distance, measured along a centre axis of the cylinder, between a most distal and/or bottom ridge and a proximal neighbouring ridge may be smaller than a second distance between two proximal ridges.

In one embodiment, the device is essentially symmetric and preferably comprises a centre plane which is a plane of symmetry.

In one embodiment, the cylinder comprises a first locking surface on a first side of the centre plane and a second locking surface on an opposite second side.

In one embodiment, the locking surface of the cylinder comprises a D-shape or a double-D shape, which gives the advantages of that the mounting and locking positions could be stable positions and that the user could get tactile feedback when turning the lever.

In one embodiment, the locking device is arranged to, in the locking position, lock the adjacent panel to the panel by pressing it against a wall of the groove.

In one embodiment, the hole is a circular hole, a circular segment of the hole extends into the groove with the height of the circular segment and the chord of the circular segment defines a width of the opening.

In one embodiment, a largest diameter of the cylinder is substantially equal to the diameter of the hole, which involves that the locking device could be fastened in the hole via friction and at the same time be turned.

In one embodiment, the part of the locking surface extends, in the locking position, through the opening into the groove with a length that is 5-25% of the largest diameter of the cylinder, preferably the length is 10-15% of the largest diameter of the cylinder.

In one embodiment, the length in the radial direction of the cylinder that the part of the locking surface extends into the groove in the locking position substantially corresponds to the height of the circular segment.

In one embodiment, the cylinder, in the mounting position, does not extend through the opening into the groove. The groove is thus free to insert the adjacent panel.

In one embodiment, the length of the part of the locking surface that extends into the groove through the opening is configured to gradually increase when the locking device is moved from the mounting position to the locking position, which gives the user a tactile feedback of that the adjacent panel is locked.

In one embodiment, the locking surface of the cylinder comprises one or more ridges to increase the force that the locking device exert on the adjacent panel, by concentrating the force to one or more points. The ridges can also cut into the adjacent panel and/or the wall of the hole to increase the strength of the locking device and the force exerted.

In one embodiment, the one or more ridges extend around at least a part of a circumference of the locking surface, which opens up for that the force from the locking device could be different in different positions.

In one embodiment, a height of the ridges varies along its extension which further opens up for that the force from the locking device could be different in different positions.

In one embodiment, the one or more ridges, preferably all the ridges, each extend in a respective plane, such as a horizontal plane or a plane parallel the bottom base.

In one embodiment, the one or more ridges has a non-helical shape configured to press the adjacent panel when moving the locking device from the mounting position to the locking position.

In one embodiment, the adjacent panel comprises a second hole that is configured to be arranged at the opening and to interact with the cylinder to lock the adjacent panel to the panel. In one embodiment, the locking surface of the cylinder comprise at least one ridge that, in the locking position, is configured to be arranged at least partly in the second hole. In addition to the pressing force exerted from the locking device, the second hole interacting with the cylinder achieves a further mechanical lock. The set of panels also involves the advantage of that the adjacent panel does not need to be machined in a complicated manner, since a hole could be accomplished in an easy and cost efficient manner.

In one embodiment, the lever is connected to the cylinder at an inner end and at an outer end comprises a lock pin that, in the locking position, is configured to be arranged in the groove at a distance from the hole and to lock the lever from turning from the locking position towards the mounting position.

In one embodiment, the locking device is configured such that the outer end of the lever is, in the mounting position, arranged at a distance from the adjacent panel and in the locking position adjacent, preferably in contact, with the adjacent panel, which makes it easy for a user to grab the outer end and to turn the locking device.

In one embodiment, the locking device is configured such that the lever extends, in the mounting position, in an essentially perpendicular direction or within the range of about 70° to about 110° from the adjacent panel.

In one embodiment, the locking device is configured to be moved between the mounting position and the locking position by turning the lever and the cylinder between 0°-100°, preferably between 0°-90°.

In one embodiment, the panel and the adjacent panel is one of a bottom piece of a drawer, a frame and a back piece of a furniture product.

At least some of the above identified and other objects and advantages that may be apparent from the description have been achieved by a locking device for a furniture product in accordance with the above.

At least some of the above and other objects and advantages that may be apparent from the description have been achieved by a third aspect: a method for assembly of a set of panels in accordance to the above. The method comprising: inserting the first edge of the adjacent panel into the groove of the panel; inserting the cylinder of the locking device into the hole of the panel to a mounting position, and turning the lever in any of a first locking direction, such as a clockwise direction, or an opposite second locking direction, such as a counter-clockwise direction, to move the locking device from the mounting position to a respective first or second locking position to lock the first edge of the adjacent panel in the groove.

In one embodiment, the method comprise the further steps of turning the lever in a first unlocking direction or an opposite second unlocking direction to move the locking device from the locking position to the mounting position to unlock the first edge of the adjacent panel in the groove, and removing the first edge of the adjacent panel from the groove of the panel.

At least some of the above and other objects and advantages that may be apparent from the description have been achieved by a fourth aspect: a method for assembly of a set of panels in accordance to the above. The method comprising: inserting the first edge of the adjacent panel into the groove of the panel; inserting the cylinder of a first of said locking device into a first hole of the panel to a mounting position; turning the lever of the first locking of said device in a first locking direction, such as a clockwise direction, to move the locking device from the mounting position to a locking position to lock the first edge of the adjacent panel in the groove; inserting a the cylinder of a second of said locking device into a second hole of the panel to a mounting position; turning the lever of the second of said locking device in a second locking direction being opposite the first locking direction, such as a counter-clockwise direction, to move the second of said locking device from the mounting position to a locking position to lock the first edge of the adjacent panel in the groove. Preferably the respective levers of the first and the second of said locking device extend in opposite directions in the locking position.

In one embodiment, the method comprise the further steps of turning the respective lever of the first and the second of said locking device in an unlocking direction being opposite the respective locking direction, to move the locking device from the locking position to the mounting position to unlock the first edge of the adjacent panel in the groove, and removing the first edge of the adjacent panel from the groove of the panel.

Further aspects of the invention are disclosed in the appended claims.

BRIEF DESCRIPTION OF DRAWINGS

These and other aspects, features and advantages of which embodiments of the invention are capable of, will be apparent and elucidated from the following description of embodiments of the present invention, reference being made to the accompanying drawings, in which:

FIG. 6A shows a furniture product comprising four panels according to an embodiment.

FIG. 6B shows details of the embodiment of FIG. 6A.

FIG. 6C shows details of the embodiment of FIG. 6B.

FIG. 6D shows details of the embodiment of FIG. 6B.

FIGS. 11A-11B show 3D-views of a locking device according to an embodiment.

FIG. 11C shows a side view of the locking device of FIGS. 11A-11B.

FIG. 11D is a bottom view of the locking device of FIGS. 11B.

FIG. 11E is a top view of the locking device of FIGS. 11A-11B

DETAILED DESCRIPTION

Figure 1:
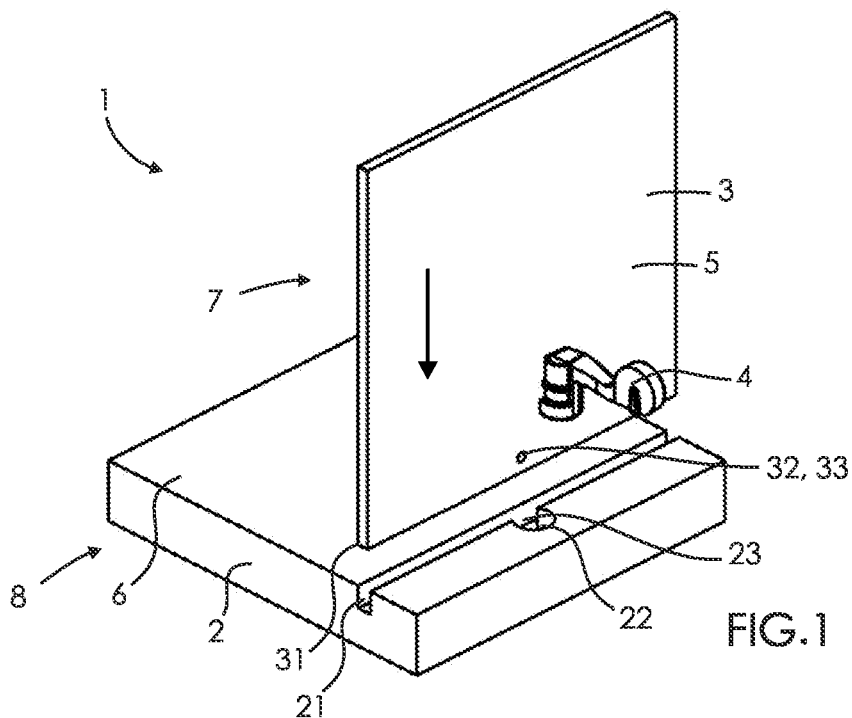
FIG. 1 is a perspective view of a set of panels in one embodiment of the invention in an unassembled state.

Aspects of the present disclosure will be described more fully hereinafter with reference to the accompanying drawings. The set of panels and their parts disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same embodiment of hardware.

When the word "about" is used in this specification in connection with a numerical value, it is intended that the associated numerical value include a tolerance of +/-10% around the stated numerical value.

The different aspects of the invention disclosed herein can be combined with the other aspects described herein. Two or more aspects could be combined.

An embodiment of the present invention, as shown in FIG. 1, to which now is referred to, discloses a set of panels 1. The set of panels 1 are preferably for a furniture product. The set of panels 1 comprise a panel 2 and an adjacent panel 3. The panel 2 and the adjacent panel 3 are arranged to be connected to each other and be perpendicular to each other. The panel 2 and the adjacent panel 3 each preferably comprises four edges, an outer surface 5, 6 and an inner surface 7, 8. The outer and/or the inner surfaces may comprise a decorative layer (not shown).

Figure 4A:
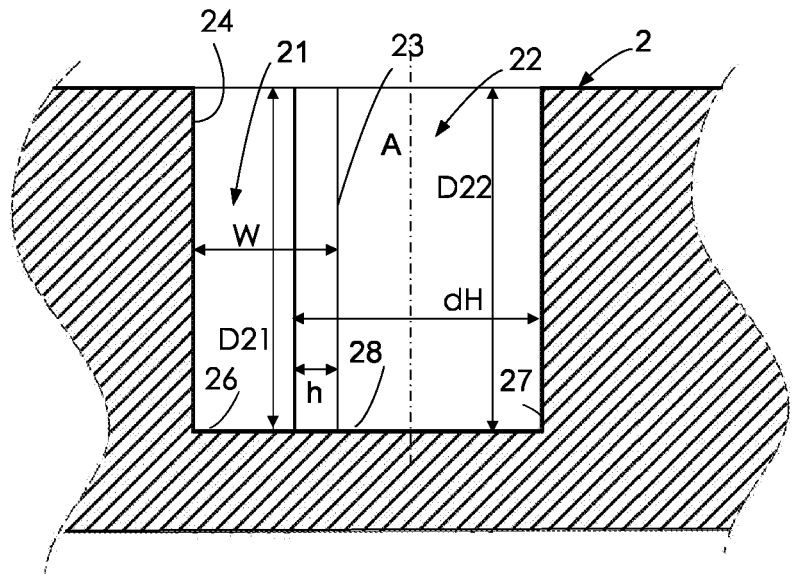
FIG. 4A is a cross sectional view of a part of a panel disclosing a groove and a hole.

An embodiment of the panel 2 is disclosed in FIGS. 1, 2A-2B, 3A-5C, 6A-6D, 9A-9D 10A-10D and 12A-12D. The panel 2 comprises a groove 21 and at least one hole 22. The hole 22 is connected to the groove 21 via an opening 23. Referring to FIG. 4A, the groove 21 has a depth D21 and a width W. The groove 21 runs, in one embodiment, parallel to an edge of the panel 2. The groove 21 may extent the entire length of the parallel edge of the panel 2; alternatively, the groove 21 may extend less than the entire length of the parallel edge of the panel 2. The length of the groove 21 is, in one embodiment, equal to or larger than the length of a first edge 31 of the adjacent panel 3 that should be arranged in the groove 21. The circumference of the hole 22, in one embodiment, overlaps an extension of the groove 21. A plane that defines the connection between the hole 22 and the groove 21 is defined as the opening 23. The hole 22 has a depth D22. The hole 22 may be a through-hole (not shown) extending all the way through the panel 2. As mentioned, depth D22 may be the same or substantially the same as depth D21; alternatively, depth D22 may be greater than depth D21.

Figure 4B:
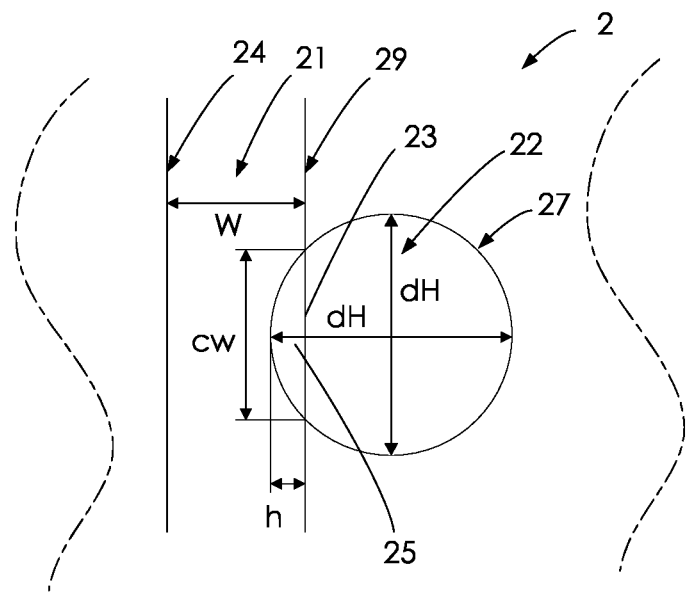
FIG. 4B is a view from above of a part of a panel disclosing the groove and the hole.

In one embodiment, the hole 22 is a circular hole 22, as disclosed in FIG. 4B. A circular segment 25 of the hole 23 overlaps with the groove 21. The circular segment 25 may extend into the groove 21. The hole 22 extends into the groove 21 with the height h of the circular segment 25. A chord of the circular segment 25 that extends into the groove 21 is another way to describe the opening 23. The length of the chord of the circular segment 25 defines a width cw of the opening 23. The hole 22 has a diameter dH.

The groove 21 has a wall 24 and a bottom 26. The hole 22 has wall 27 and a bottom 28. The hole 22 defines an axis A.

The adjacent panel 3 comprises a first edge 31, as disclosed in FIGS. 1, 6D, 9D and 10D. The first edge 31 of the adjacent panel 3 is configured to be arranged in the groove 21 of the panel 2. The thickness of the adjacent panel 3, at least at the first edge 31, is equal to or smaller than the width W of the groove 21 of the panel 2. The adjacent panel 3 may comprise a second hole 32. The position of the second hole 32 is such that it is configured to be arranged at the opening 23 of the panel 2. The second hole 32 may be configured to interact with the cylinder 41 to lock the adjacent panel 3 to the panel 2. The second hole 32 has a wall 33. The second hole 32 may be a through-hole 32, i.e. a through-going hole. The second hole 32 may have a bottom (not shown).

The locking device 4 is configured to lock the first edge 31 of the adjacent panel 3 in the groove 21 of the panel 2. The locking device 4 may be adapted to lock the adjacent panel 3 to the panel 2. By lock is meant that that the first edge 31 of the adjacent panel 3 is restricted from moving out of the groove 21 of the panel 2; this may be from moving out of the groove 21 in the opposite direction as the arrow in FIG. 1 and/or laterally along the length of the groove 21. The locking device 4 may increase the force in at least one direction that has to be exerted to the adjacent panel 3 in comparison to the force that has to be exerted to the adjacent panel 3 to remove it from the groove 21 without the locking device 4. For example, the increased force may be at least twice as great, or at least five times as great.

Embodiment of the locking device 4 is disclosed in more detail in FIGS. 7A-7E, 8A-8D, 11A-11E and 12A-12C. The locking device 4 comprises a cylinder 41 and, preferably, a lever 42. In an embodiment, the locking device could be configured to be rotated with a tool. For example, the locking device could including a groove or grooves (not shown) on a top base configured to allow the locking device to be rotated by means of a screw driver, alien wrench, or similar tool. The lever 42 is connected to the cylinder 41. The cylinder 41 is configured to be arranged in the hole 22 in the panel 2. The cylinder 41 is at least partially a circular cylinder 41. At least a portion of the cylinder 41 may have a constant radius R1. Apart from one or more ridges 46 and an essentially planar surface 47, the cylinder may preferably have a constant radius R1. The cylinder comprises a top base 43, a bottom base 44. A locking surface 45 comprising a first locking surface 45a and an opposite second locking surface 45b connects the top and bottom base 43, 44.

The locking device 4 may be made of a material that is one or a mix of a metal or a polymer material, such as a thermoplastic material, preferably with a reinforcement, such as glass fibre. The locking device 4 may be produced by injection moulding.

The cylinder 41 is configured to act as a cam when the cylinder 41 is turned about the axis A in the hole 22. The cylinder 41 will interact with the adjacent panel 3 and may displace the adjacent panel 3 when it is turned, or at least exert a force on the adjacent panel 3. The largest diameter dL of the cylinder 41 may be substantially equal to the diameter of the hole dH. Substantially equal may be within 10% of each other, or within 5% of each other, or within 3% of each other. By having the diameter, including the largest diameter dL, of the cylinder 41 being designed to correlate with the diameter of the hole 22, the cylinder 41 can be arranged in the hole 22 and held in position in the hole 22 by friction between the walls 27 of the hole 22 and the cylinder 41.

In one embodiment, the locking surface 45 of the cylinder 41 comprises one or more ridges 46 as disclosed in FIGS. 7A-7E and 8A-8D. In one embodiment, as disclosed in FIGS. 8A-D, the locking device 4 comprises a plurality of ridges 46 on the locking surface 45.

In one embodiment, as disclosed in FIGS. 8A-D, the first and second locking surfaces 45a, 45b each comprises three ridges 46a, 46b, 46c. The ridges 46 concentrates the force exerted from the locking device 4 to the adjacent panel 3 to the edges of the ridges 46. The force from the locking device 4 may be divided between the number of ridges 46. If there are a low number of ridges 46 the force exerted by each ridge 46 is larger than if there are more ridges 46. In one embodiment, the ridges are adapted to cut into the wall 27 of the hole 22. In one embodiment, the ridges are adapted to cut into the adjacent panel 3 as disclosed in FIG. 5B. And, in one embodiment, the ridges are adapted to cut into both the adjacent panel 3 and into the wall 27 of the hole 22.

In one embodiment, the one or more ridges 46 extend around at least a part of a circumference of the locking surface 45. In one embodiment, the ridges do not extend around the whole circumference of the locking surface 45. In one embodiment, the ridges each extend in an arc circle of between 50°-180° of the circumference of the locking surface 45. In one embodiment, the ridges extend around between 80°-120° of the circumference of the locking surface 45. In one embodiment, the ridges extend around between 90°-100° of the circumference of the locking surface 45. The ridges 46 have a height in the radial direction of the cylinder 41. The height of the ridges 46 may be the distance/length that the ridges 46 extend in the radial direction. In one embodiment, the ridge 46 have a triangular shape with a top angle that is equal to or less than 90°, such that the ridge 46 has a sharp edge that is adapted to interact with (such as a frictional grip and/or penetration) the wall 27 of the hole 22.

In one embodiment, the height of the respective ridges 46 varies along its extension. The height of the ridges 46 may vary along the circumference of the locking surface 45. In one embodiment, the one or more ridges 46 has a non-helical shape. For example, the ridges 46 may only extend in a radial direction and in a circumferential direction of the cylinder.

In one embodiment, the locking surfaces 45a, 45b of the cylinder 41 comprises at least one ridge 46, such as a top ridge 46a, middle ridge 46b, and bottom ridge 46c, as is disclosed in FIGS. 8A-D. In one embodiment, an edge of the ridge 46 has an inclined surface 48.

The lever 42 has an inner end 42a and an outer end 42b, as disclosed in FIGS. 7A-7E, 11A-11E and 12B-12C. The lever 42 is connected to the cylinder 41. The inner end 42a of the lever 42 is connected to the cylinder 41. In one embodiment, the outer end 42b comprises a handle configured to be moved by a user. The handle and the cylinder may be moulded in one piece.

Figure 9A:
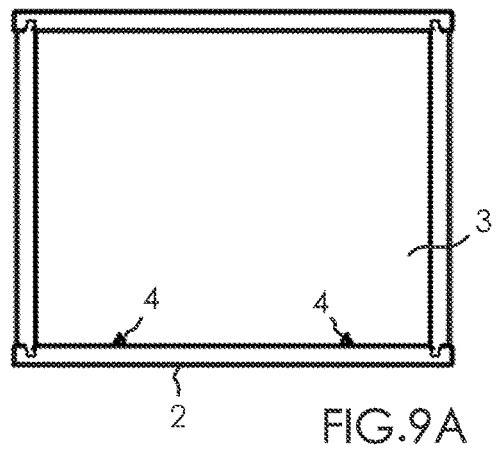
FIG. 9A shows a furniture product comprising four panels and a locking device configured in mounting position, according to an embodiment.
Figure 9B:
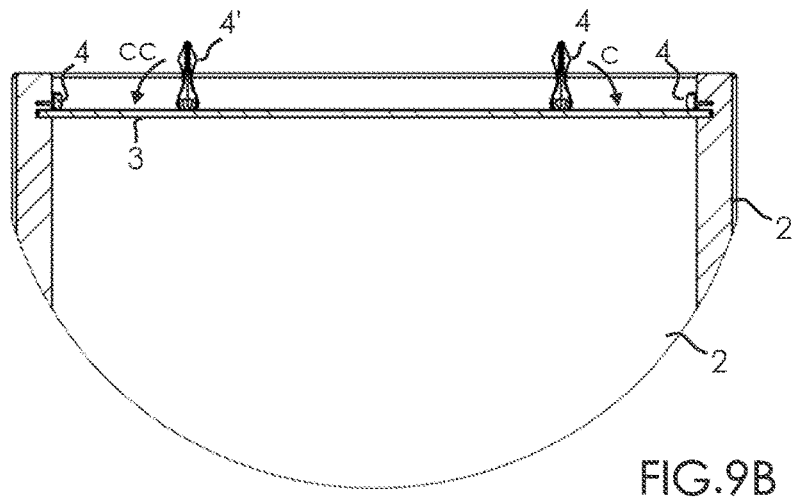
FIG. 9B shows details of the embodiment of FIG. 9A.
Figure 9C:
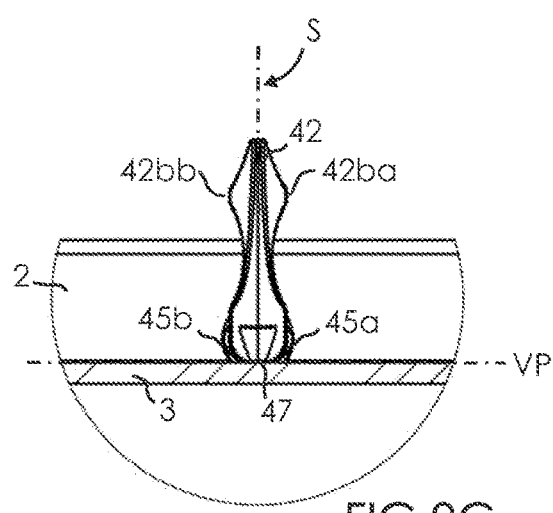
FIG. 9C shows details of the embodiment of FIG. 9B.
Figure 9D:
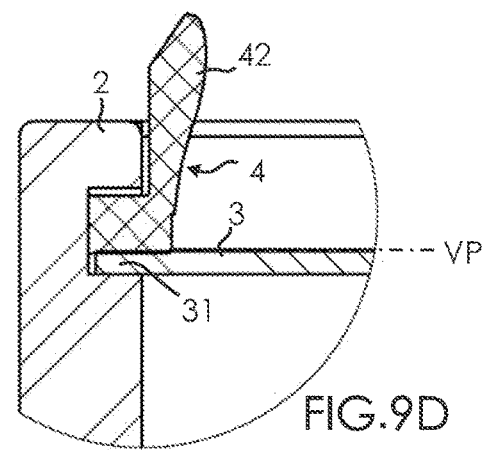
FIG. 9D shows details of the embodiment of FIG. 9B.
Figure 10A:
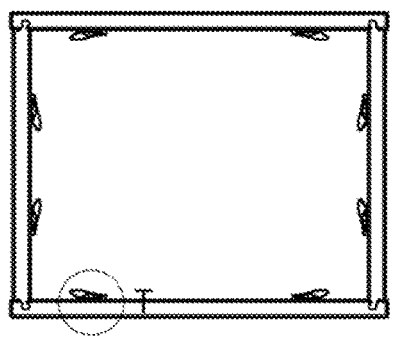
FIG. 10A shows a furniture product comprising four panels and a locking device configured in locking position, according to an embodiment.
Figure 10B:
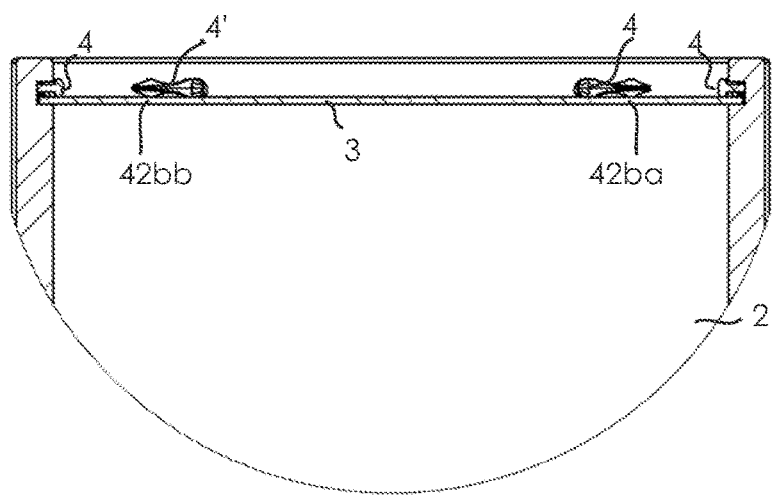
FIG. 10B shows details of the embodiment of FIG. 10A.
Figure 10C:
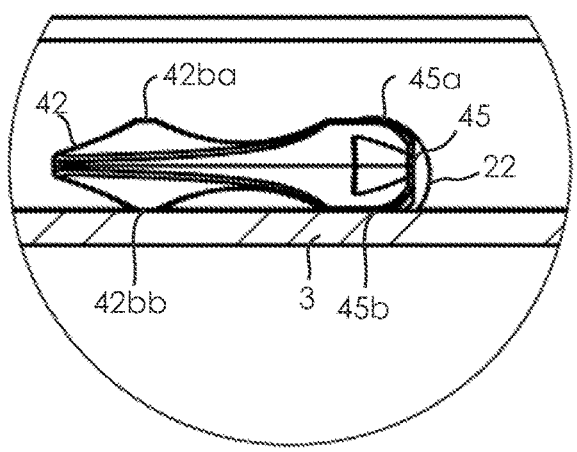
FIG. 10C shows details of the embodiment of FIG. 10B.
Figure 10D:
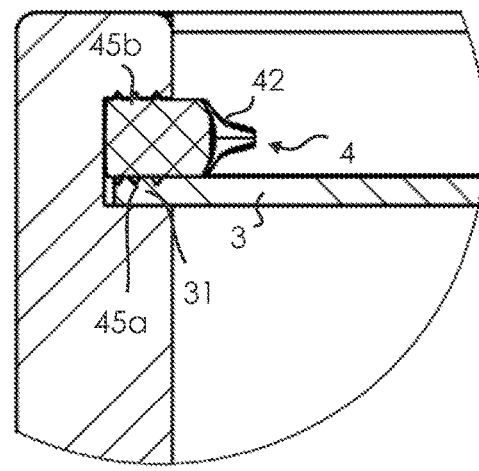
FIG. 10D shows details of the embodiment of FIG. 10B.

The lever 42 is configured to, when turned, turn the cylinder 41 about the axis A between a mounting position, lever at 0° as disclosed in FIGS. 9A-9D, and a locking position, as disclosed in FIGS. 10A-10C at 90°. In one embodiment, the locking device 4 is configured to be moved between the mounting position and the locking position by turning the lever 42 and the cylinder 41 +/−90°. FIG. 5B shows the locking device 4 rotated −90° to a first locking position and FIG. 5C shows the locking device rotated +90° to a second locking position. Thus the locking device may be rotated in a first direction to a first locking position and rotated in a second in a second opposite direction to a second locking position.

In the mounting position, shown in FIGS. 9A-9D, the first edge 31 of the adjacent panel 3 is free to be arranged in the groove 21 of the panel 2. The first edge 31 of the adjacent panel 3 is arranged in the groove 21 by moving the adjacent panel 3 toward the panel 2, as shown by the arrow in FIG. 1, and inserting the first edge 31 into the groove 21. In one embodiment, the cylinder 41 does not extend through the opening 23 into the groove 21 in the mounting position. In one embodiment, the cylinder 41 may slightly extend through the opening 23 into the groove 21 in the mounting position; however, in the locking position, the cylinder 41 extends further into the groove 21.

In one embodiment, the locking device 4 is configured such that the lever 42 extends, in the mounting position, in an essentially perpendicular direction or within the range of about 90° from the adjacent panel 3, as disclosed in FIG. 9C.

Referring again to FIGS. 5A-5B, 7A-7E and 8A-8C, there is shown an exemplary embodiment of the locking device 4. The locking device 4 comprises the cylinder 41 and the lever 42 connected to the cylinder 41. The cylinder 41 is configured to be arranged in the hole 22 in the panel 2. The cylinder is configured to be displaceable in the hole 22 between a first mounting position and a second locking position by means of rotation of the cylinder, as was shown in FIGS. 2A-2B and 3A-3B. The locking device 4 may in any embodiment of the disclosure be essentially symmetrical or symmetrical. This feature facilitates that the locking device may lock the adjacent panel 3 and the panel 2 by means of any of a clockwise or counter-clockwise rotation, as shown in FIGS. 2A-2B and FIGS. 3A-4B respectively.

Figure 5A:
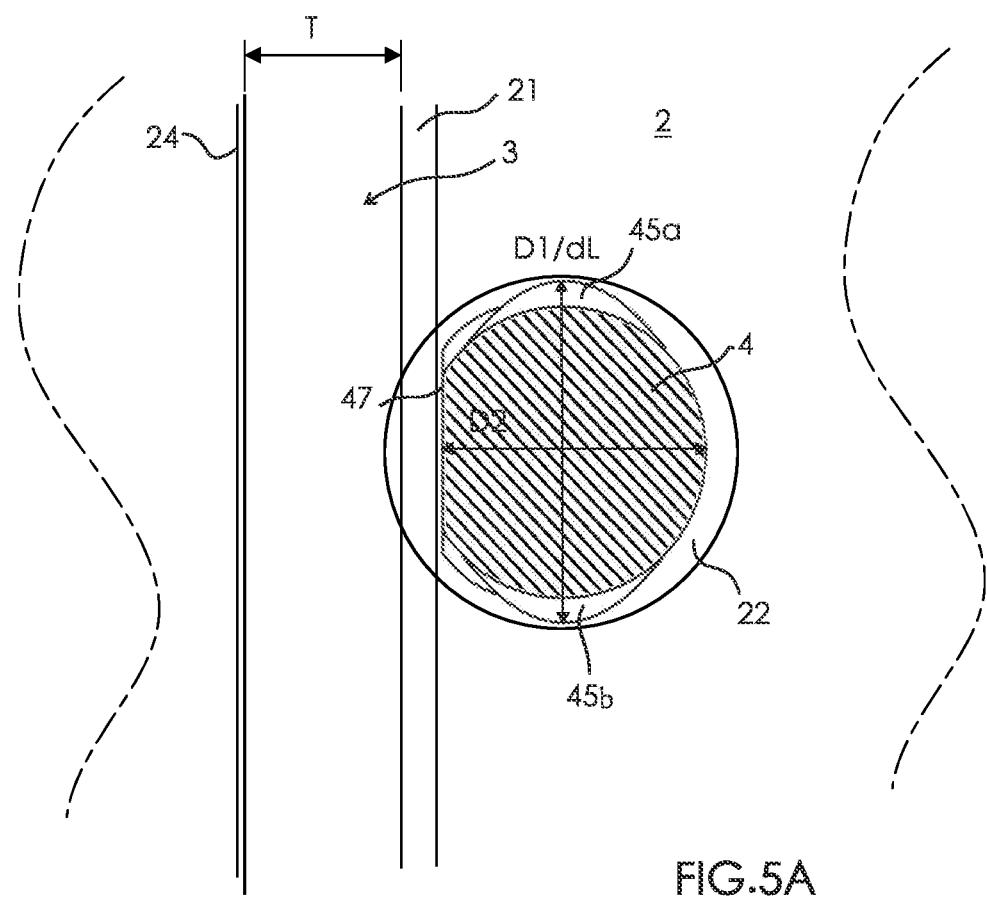
FIG. 5A is a cross sectional view of a part of an unassembled set of panels disclosing the adjacent panel in the groove and the cylinder in the hole.
Figure 5B:
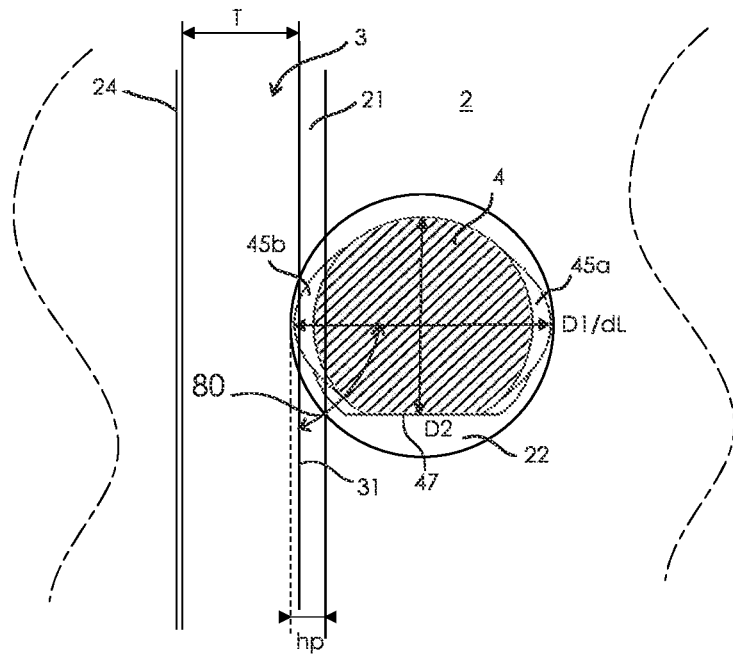
FIG. 5B is a cross sectional view of a part of an assembled set of panels disclosing the adjacent panel in the groove and the cylinder in the hole.
Figure 5C:
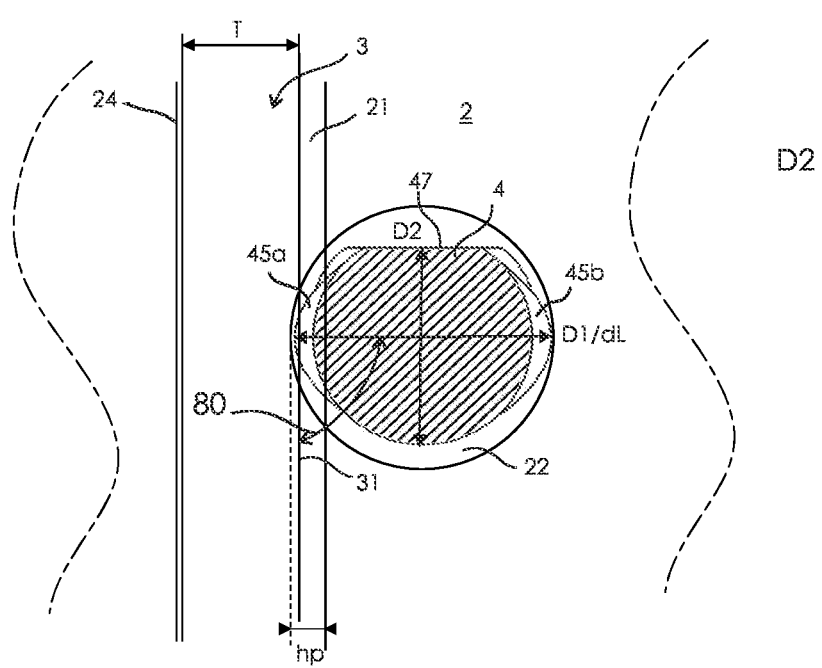
FIG. 5C is a cross sectional view of a part of an assembled set of panels disclosing the adjacent panel in the groove and the cylinder in the hole.

The cylinder 41 comprises the essentially planar surface 47 configured to be arranged adjacent and/or facing and/or in abutment with the opening 23 in the mounting position shown for instance in FIG. 5A.

A plane S of the cylinder 41 and preferably the locking device 4 which is orthogonal the planar surface 47 and the bottom base 44 may constitute a centre plane of the cylinder 41. The plane S may be a symmetry plane of the cylinder 41 and/or the locking device 4. Thus, the locking device 4 may in some embodiments comprise a plane of symmetry S as shown in FIGS. 7A-7E.

The bottom base 44 may be configured to be oriented parallel the panel 2, the planar surface 47 parallel the adjacent panel 3 and the plane S orthogonal the panel 2 and the adjacent panel 3 in the mounting position.

Figure 7A:
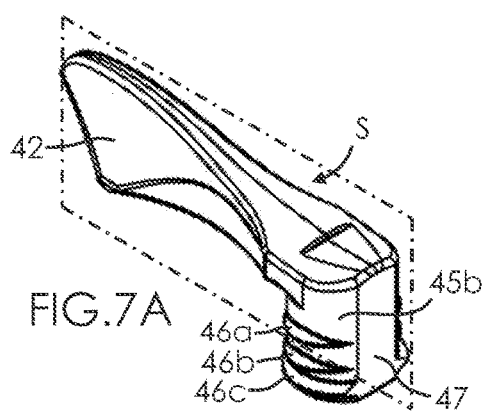
FIGS. 7A-7B show 3D-views of a locking device according to an embodiment.
Figure 7B:
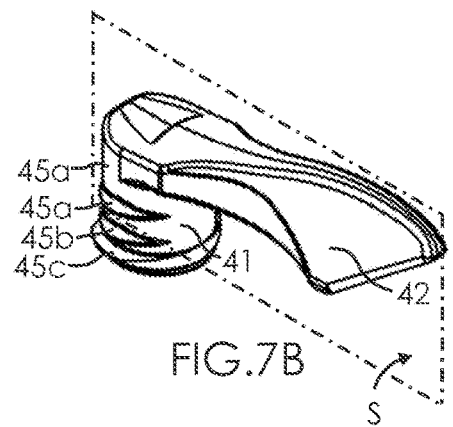
Figure 7C:
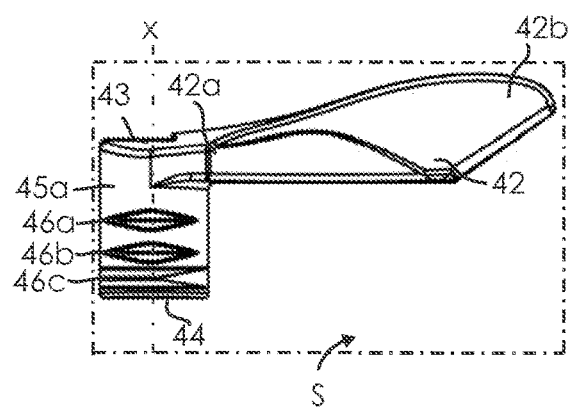
FIG. 7C shows a side view of the locking device of FIGS. 7A-7B.
Figure 7D:
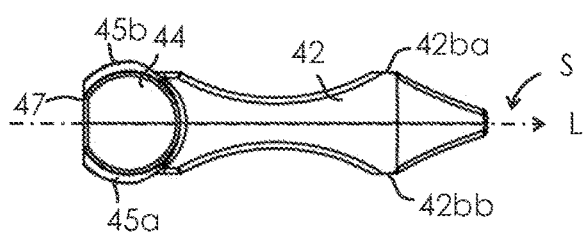
FIG. 7D is a bottom view of the locking device of FIGS. 7A-7B.
Figure 7E:
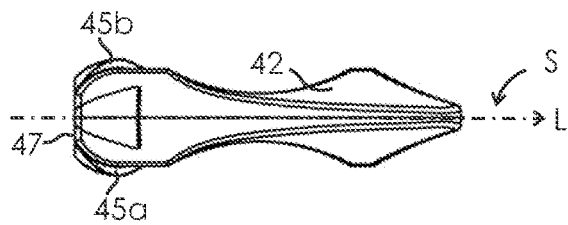
FIG. 7E is a top view of the locking device of FIGS. 7A-7B.

The cylinder 41 comprises the first locking surface 45a on a first side of the plane S and the second locking surface 45b on an opposite second side, as shown in FIGS. 7D-7E.

The locking surfaces 45a, 45b may each comprise the ridges 46, such as at least two ridges, three ridges, four ridges, five ridges or six ridges. The ridges 46 are protruding in a radial direction from each of the first and second locking surface 45a, 45b. The ridges 46 may project in a direction parallel the planar surface 47. The ridges 46 may preferably include respective ridges 46a, 46b, 46c on each of the locking surfaces 45a and 45b as shown in FIGS. 8A-8B.

Figure 8A:
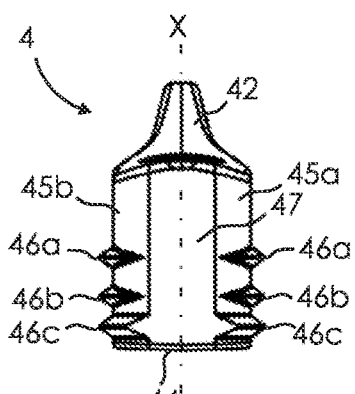
FIG. 8A is a front view of a locking device according to an embodiment.
Figure 8B:
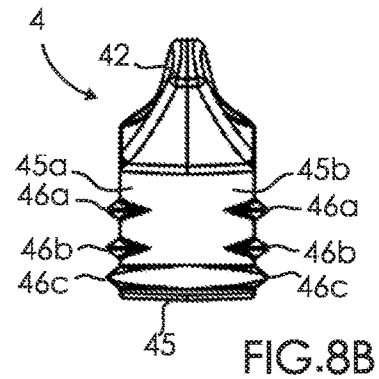
FIG. 8B is rear view of a locking device according to an embodiment.
Figure 8C:
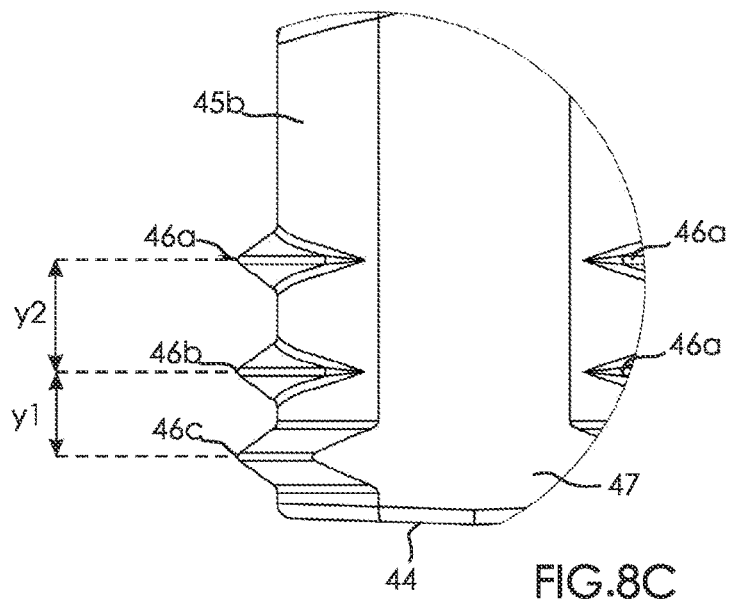
FIG. 8C shows details of the embodiment of FIG. 8A.

As shown in FIG. 8C, the ridges 46a, 46b, 46c may be provided on a distal ⅔ portion of the cylinder 41, wherein by distal is meant towards the bottom base 44. In other words, the ridges 46 may be provided on a portion of the cylinder 41 extending from the bottom base 44 and up to ⅔ of the distance between the bottom base 44 and the top base 43.

The ridges 46 may preferably protrude from the cylinder in a direction transverse the longitudinal axis X of the cylinder 41, i.e. in a radial direction as has been explained here, such as along respective planes parallel the plane of the bottom base 43. The ridges 46 may extend in a respective single plane and/or be non-helical.

As mentioned, one or more of the ridges 46 may preferably extend discontinuously along the circumference of the cylinder 41, as shown for example in FIGS. 7C and 8A.

One or more, preferably none of the ridges 46 extend along the whole circumference of the cylinder 41, thus the ridges 46 may comprise a front end adjacent the planar surface 47 where its radial projection is at a minimum and an opposite back end in a direction along the circumference of the cylinder 41 where its radial projection is at a minimum.

At least two of the ridges 46a, 46b, 46c may extend along the circumference of the cylinder 41 in different arc circles of the cylinder 41.

For example, in any embodiment one or more of the ridges 46 may extend directly contiguous with said planar surface 47, such as ridge 46c in FIG. 8C. Ridge 46c may be a lowermost ridge adjacent the bottom base 44.

For example, in any embodiment, one or more of the ridges 46 may be separated the planar surface 47 along a circumference of the cylinder 41, such as ridges 46a, 46b shown in FIG. 8C. As derivable from FIG. 8C, one or more of the ridges, such as proximal ridges 46a, 46b may essentially not protrude from the cylinder 41 immediately adjacent the planar surface 47 and thus be separated the planar surface 47 along a circumference of the cylinder 41.

By configuring at least two of the ridges 46a, 46b, 46c to extend in different arc circles, the timing by which the at least two ridges engage with the adjacent panel 3 may be configured such that the cylinder 41, including the ridges, gradually or sequentially engage with the adjacent panel 3. Thereby it may be facilitated that the locking device 4 including the cylinder 41 is easier to rotate, such that easy installation is facilitated.

The lever 42 extends from an inner end 42a to an outer end 42b in a direction substantially transverse the planar surface 47.

The plane S may preferably be configured to be arranged substantially orthogonal the adjacent panel 3 and the panel 2 in the mounting position, as shown in FIG. 9C.

The cylinder 41 may comprise at least one cross-section parallel the planar surface 47 being configured to lock the first edge 31 of the adjacent panel 3 in the groove 21 by means of any of a clockwise rotation of the cylinder 41 and a counter-clockwise rotation of the cylinder 41 initiated in the mounting position.

Referring to FIG. 8C, the ridge 46c provided adjacent the bottom base 44 constitutes a distal ridge, i.e. typically furthest away from the user during installation and arranged furthest into to the hole 22. Accordingly, the ridges 46a and 46b constitute proximal ridges.

In any embodiment, the distal ridge 46c may be configured to displace the adjacent panel 3 in response to rotation of the cylinder 41 from the mounting position to the locking position. In any embodiment, the proximal ridges 46a, 46b may be configured to cut into the material of the inner wall 27 of the hole 22 in response to rotation of the cylinder 41 from the mounting position to the locking position.

As shown in FIG. 8C, a dimension y2 between individual proximal ridges 46a, 46b may be different from the dimension between the distal ridge 46c and a neighbouring proximal ridge 46b. The first dimension y1 may be measured between an outermost point, in the radial direction, of the distal ridge 46c adjacent the bottom base 44 and a neighbouring proximal ridge 46b, such as a middle ridge. The second dimension y2 may be measured between the two adjacent proximal ridges 46a, 46b provided above the bottom ridge 46c. The said dimensions y1, y2 may be measured along the centre axis X of the cylinder.

The panel 2 is typically stronger closer to the bottom of the hole 22 than closer to the opening of the hole 22. Stronger may entail that the material of the panel is less susceptible to crumbling and/or holds together compared to material closer to the surface of the panel. For example, the material of the panel, which may comprise wood particles, may be more prone to crumble close to the opening in response to an applied force, such as from a ridge. It may thus be desirable to provide a locking device that primarily achieves a locking function by engaging with the panel 2 close to the bottom of the hole 22 and/or adjacent the bottom base 44 of the locking device 4. By providing a dimension y2 between individual proximal ridges 46a, 46b which is smaller than the dimension between the distal ridge 46c and a neighbouring proximal ridge 46b, it may thus be facilitated that crumbling of the panel material is avoided or at least to some extend reduced.

The volume of the distal ridge 46c may preferably be greater than the volume of one or more of the distal ridges 46a, 46b. By this configuration, each of the proximal ridges 46a, 46b will supplant less material of the panel than the distal ridge 46c when the cylinder 41 is rotated from the mounting position to the locking position. This configuration may bring about the technical advantage that crumbling of the panel 2 may be avoided or at least to some extent reduced.

This configuration may bring about the technical advantage that a strong locking function is facilitated at a position in the hole 22 in closer proximity of the bottom of the hole 22 than of the opening.

Figure 8D:
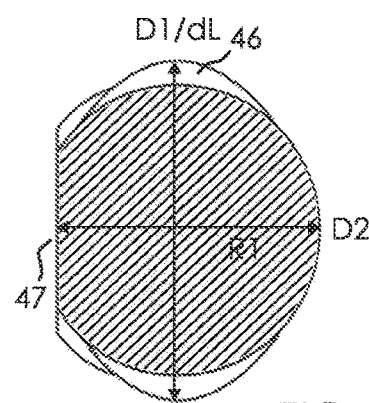
FIG. 8D is a cross-sectional view of a cylinder according to an embodiment.

FIG. 8D shows a principal cross-section view of the cylinder 41 according to an exemplary embodiment. A first width D1 is measured parallel the planar surface 47 between the outermost points of the ridges 46, in a radial direction. D1 may be equal dL. A second width D2 is measured transverse the planar surface 47 and transverse the first width D1, i.e. between the planar surface 47 and the opposite circumference of the cylinder 41.

The first width D1 is preferably greater than the second width D2. The first width D1 is preferably greater than the distance between the opening 23 and the opposite interior wall 27 of the hole 22 and extends by a distance h into the groove 21.

As derivable from FIG. 8D, the cylinder, excluding the planar surface and the ridges, may have a circular cross section and an elliptical cross section including the ridges. The diameter D1/dL is measured at the largest diameter of the elliptical cross-section of the cylinder including the ridges 46. The diameter D2 is measured as the smallest diameter of the cylinder where there are no ridges.

At least a portion of an innermost outer circumferential surface of the cylinder 41 extending from the planar surface 47, or between planar surfaces, may comprise the constant radius R1, which is preferably an inner radius, as shown in FIG. 8D. The planar surface 47 and the radius R1 forms a D-shaped cross-section.

It has been contemplated that the cylinder 41 may comprise a second planar surface (not shown) parallel and opposite the planar surface 47. In this embodiment the planar surfaces and the radius R1 forms a double-D shaped cross section. Likewise, the adjacent panel 3 and the hole 22 may form a D-shaped cross-section.

Referring again to FIG. 8D, the cylinder comprises the first width D1 and the second width D2 in a plane transverse a longitudinal centre axis X of the cylinder. The first width D1 being parallel the planar surface 47 and a second width being D2 being transverse the planar surface. The first width D1 may be an outer diameter measured between the outermost edges of the ridges 46.

FIGS. 5B and 5C show that the first width D1 may be configured to be at a locking angle 80 to the first edge 31 in the locking position, wherein the locking angle 80 may be about 90°.

Thereby, it is facilitated that the locking device is configured such that, the extension of the cylinder 41 in a direction transverse the opening 23 is increased in response to rotation of the cylinder initiated in said mounting position.

The locking device 4 is configured to obtain said mounting position by means of arranging said planar surface facing said adjacent panel 3.

The locking device 4 is configured to obtain said mounting position by means of displacement of the cylinder 41 along its longitudinal axis X into said hole 22.

The planar surface 47 may form a vertical plane VP with the adjacent panel 3 in the mounting position as shown in FIG. 9D.

A portion of said planar surface 47 may be provided in the ridge 46c, which may be a lowermost ridge as shown in FIG. 8C.

The cylinder 41 may be configured such that, the extension of the cylinder in a direction transverse the opening 23 is increased in response to rotation of the cylinder 41 in any direction initiated in said mounting position.

In the locking position at least a portion of the first or second locking surface 45a, 45b of the locking surface 45 of the locking device 4 extend into the groove 21 through the opening 23 and lock the adjacent panel 3 in the groove 21, as disclosed in FIGS. 5A-5B. In the locking position the adjacent panel 3 is locked against the panel 2. In one embodiment, the locking device 4 is arranged to, in the locking position, lock the adjacent panel 3 to the panel 2 by pressing it against the wall 24 of the groove 21. A portion of the first locking surface 45a or the second locking surface 45b that extend into the groove 21 engage the adjacent panel 3 and press it against the wall 24 of the groove 21. The locking surface 45a 45b extends through the opening 23 with a length hP, as disclosed in FIGS. 5A-5B. In one embodiment, the portion of the locking surface 45a, 45b extend, in the locking position, through the opening 23 into the groove 21 with a length hP that is 5-25% of the largest diameter dL of the cylinder 41. In one embodiment, the portion of the locking surface 45a, 45b extend, in the locking position, through the opening 23 into the groove 21 with a length hP that is 10-15% of the largest diameter dL of the cylinder 41.

In one embodiment, the radial direction of the cylinder that the portion of the locking surface 45a, 45b that extends into the groove 21 in the locking position substantially corresponds to the height h of the circular segment 25. The direction of the height h of the circular segment 25 may be the same as the direction of the length hP of the portion of the locking surface 45a, 45b.

In one embodiment, the outer end 42b of the lever 42 is, in the locking position, arranged adjacent with the adjacent panel 3. In one embodiment, the outer end 42b of the lever 42 is, in the locking position, arranged in contact with the adjacent panel 3. The lever 42 may comprise a first locking surface 42ba and a second locking surface 42bb, for example on the outer end 42b of the lever 42. The first and second locking surfaces are configured such that they abut the adjacent panel 3 in the first and second locking positions respectively such that the locking device is stopped during rotation at a position where the ridges cut in the adjacent panel 3.

In one embodiment, the length of the portion of the first or second locking surface 45a, 45b of the locking surface 45 that extend into the groove 21 through the opening 23 is configured to gradually increase when the locking device 4 is moved from the mounting position to the locking position. As the lever 42 is moved from the mounting position towards the locking position the size of the said portion of the locking surface 45a, 45b that extends through the opening 23 increases gradually such that the force exerted from the locking device 4 on the adjacent panel 3 is also increased gradually. This gives a user of the locking device 4 tactile feedback of that the adjacent panel 3 is tighter and tighter locked in the groove 21.

In one embodiment, at least one ridge 46 is, in the locking position, configured to be arranged at least partly in the second hole 32, as disclosed in FIG. 10C. The ridge 46 in the second hole 32 will act as a further lock the adjacent panel 3 in the groove 21.

In one embodiment, the ridges are adapted to cut into the wall 27 of the hole 22, and/or the adjacent panel 3 when the locking device is moved from the mounting position towards the locking position. As the locking device 4 is turned the ridges will exert a force against the adjacent panel 3 and the wall 24 of the hole 22. If the force exceeds a value, depending on the material of the locking device 4, the adjacent panel 3 and the wall 27, the ridges 46 of the locking device 4 will cut into one or both of the wall 27 and the adjacent panel 3.

In one embodiment, the adjacent panel 3 comprises further edges that are configured to be locked against further panels 2.

In one embodiment, the panel comprises two or more holes 22 at the groove 21 and a corresponding number of locking devices 4 configured to be arranged in each hole 22. In one embodiment, the panel comprises two or more grooves 21.

In one embodiment, the panel 2 and the adjacent panel 3 is one of a bottom piece of a drawer, a frame and a back piece of a furniture product.

Hereafter a method for assembly and disassembly of the set of panels 1 according to the above will be described with reference to FIGS. 9A-9D and 10A-10D.

When a user should assembly the set of panels 1 the following step is performed. The cylinder 41 of the locking device 4 is inserted into the hole 22 of the panel 2.

The first edge 31 of the adjacent panel 3 is inserted into the groove 21 of the panel 2.

Thereafter, the lever 42 is turned to position the locking device 4 in the locking position.

Figures 2A, 3A:
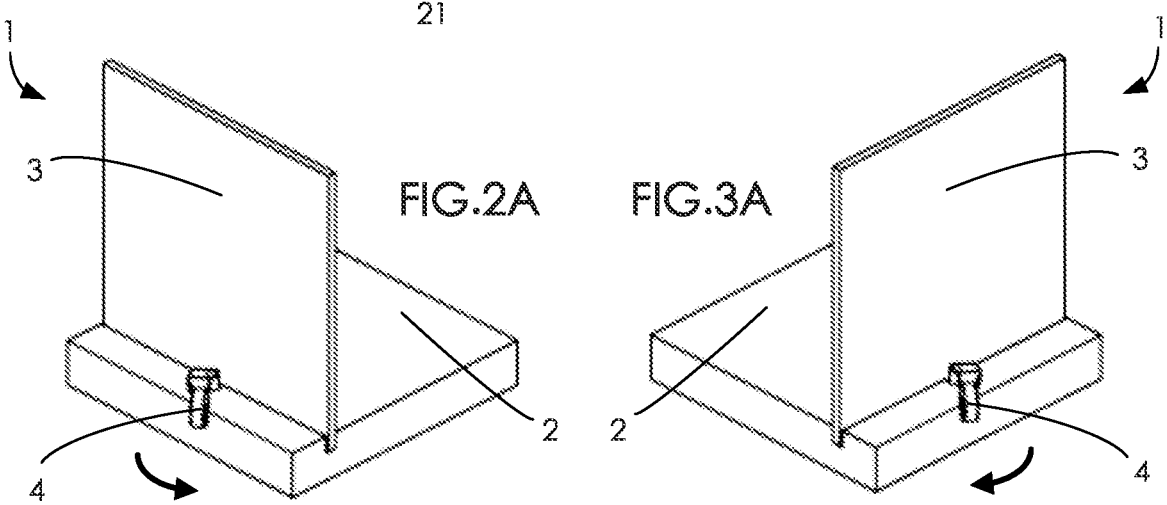
FIG. 2A illustrates one embodiment of assembling a panel with an adjacent panel.
FIG. 3A illustrates a further embodiment of assembling a panel with an adjacent panel.
Figures 2B, 3B:
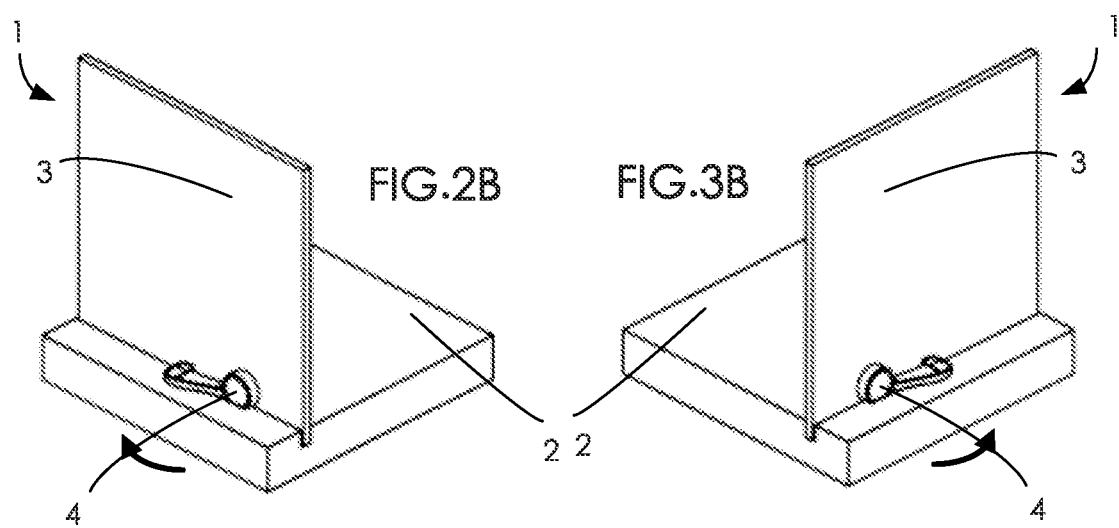
FIG. 2B illustrates one embodiment of disassembling a panel and an adjacent panel.
FIG. 3B illustrates a further embodiment of disassembling a panel and an adjacent panel.

When the first edge 31 of the adjacent panel 3 is positioned in the groove 21 the lever 42 is turned in a first locking direction, as disclosed by the arrow in FIG. 2A, or in a second locking direction as disclosed by the arrow in FIG. 3A to move the locking device 4 from the mounting position to the locking position to lock the first edge 31 of the adjacent panel 3 in the groove 21.

In one embodiment, the edge 31 of the adjacent panel 3 is inserted into the groove 21 of the panel 2 before the locking device 4 is arranged in the hole 22. Thereafter the locking device 4 is inserted into the hole 22 with the locking device positioned in the mounting position in relation to the adjacent panel 3 and the panel 2. Thus, the above described steps do not have to be performed in a specific order to lock the adjacent panel 3 to the panel 2.

In one embodiment, the locking device 4 is inserted into the hole 22 in a factory by another user or by a machine. Thus, the steps of the method could be divided to be performed by different users or by a machine.

In one embodiment, the set of panels 1 are one of a bottom piece of a drawer, a frame, a back piece of a furniture product and a panel for reinforcing an edge.

Referring in particular to FIGS. 6B, 9B and 10B, in one embodiment, the method for assembly of a set of panels in accordance to the above comprises: inserting the first edge 31 of the adjacent panel 3 into the groove 21 of the panel 2; inserting the cylinder 41 of a first of said locking device 4 into a first of said hole 22 of the panel 2 to a mounting position; turning the lever 42 of the first of said locking device 4 in a first locking direction, such as a clockwise direction, to move the locking device 4 from the mounting position to a locking position to lock the first edge 31 of the adjacent panel 3 in the groove 21; inserting a the cylinder 41 of a second of said locking device 4' into a second of said hole 22' of the panel 2 or a groove of a further panel (not shown) to a mounting position; turning the lever 42 of the second of said locking device 4' in a second locking direction being opposite the first locking direction, such as a counter-clockwise direction, to move the second of said locking device 4' from the mounting position to a locking position to lock the first edge 31 of the adjacent panel 3 in the groove 21 of the panel 2 or the further panel. Preferably the respective levers of the first and the second of said locking device extend and/or point in opposite directions in the locking position.

This configuration facilitates the advantage that first and the second of said locking device 4, 4' are configured to obtain an interlocking configuration; should the adjacent panel 3 be displaced, such as incrementally displaced, such as in a direction from the second of said locking device 4' towards the first of said locking device 4, the second of said locking device will be urged to rotate in its locking direction (cc in FIG. 9B) under the action of the displacement of the adjacent panel, whereby the second locking surface 42bb of the second of said locking device 4' may engage and/or press against the adjacent panel 3 and stop the second of said locking device 4' in the locking position and hence secure the locking function of the second of said locking device 4'.

Accordingly, should the adjacent panel 3 be displaced, such as incrementally displaced, such as in a direction from the first of said locking device 4 towards the second of said locking device 4', the first of said locking device 4 will be urged to rotate in its locking direction (c in FIG. 9B) under the action of the displacement of the adjacent panel 3, whereby the second first locking surface 45ba of the first of said locking device 4 may engage and/or press against the adjacent panel 3 and stop the first of said locking device 4 in the locking position and hence secure the locking function of the first of said locking device 4.

After the set of panels 1 are assembled and the user, or another user, would like to disassembly the set of panels 1 the following steps are performed. Turning the lever 42 in a first unlocking direction being opposite the first locking direction or a second unlocking direction being opposite the second locking direction respectively, as disclosed by the arrow in FIGS. 2B and 3B, to move the locking device 4 from the locking position to the mounting position to unlock the first edge 31 of the adjacent panel 3 in the groove 21. When the lever 42 is moved back to the mounting position the cylinder 41 will turn together with it. As the cylinder 41 turns towards the mounting position the length of the portion of the first or second locking surface 45a, 45b respectively that extend through the opening 23 decreases and the force exerted by the locking device 4 on the adjacent panel 3 is thus also decreased. In any embodiment, typically said portion of the first or second locking surface 45a, 45b mainly or exclusively comprises ridges 46. Thereafter, the first edge 31 of the adjacent panel 3 is removed from the groove 21 of the panel 2 and the set of panels 1 is disassembled.

In one embodiment, the above steps are repeated and the set of panels 1 is assembled again. In one embodiment, the panel 2 and/or the adjacent panel 3 is locked to another adjacent panel 3 and/or panel 2.

In one embodiment, the panel 2 comprises a groove 21 which comprises a width W which may be equal to or greater than the width T of the adjacent panel 3. The largest diameter dL of the locking device 4 may be larger than the width T of the adjacent panel 3. The smallest diameter of the locking device 4 may be larger than the width T of the adjacent panel 3. The width T of the adjacent panel 3 may be in the range of about 2 mm to about 10 mm or in the range of about 2 mm to about 5 mm.

In one embodiment, the edge 31 of the adjacent panel 3 and the locking device 4 are configured to be arranged in the groove 21 and the locking device 4 is turned in the groove 21 between the mounting position and the locking position.

Figure 12A:
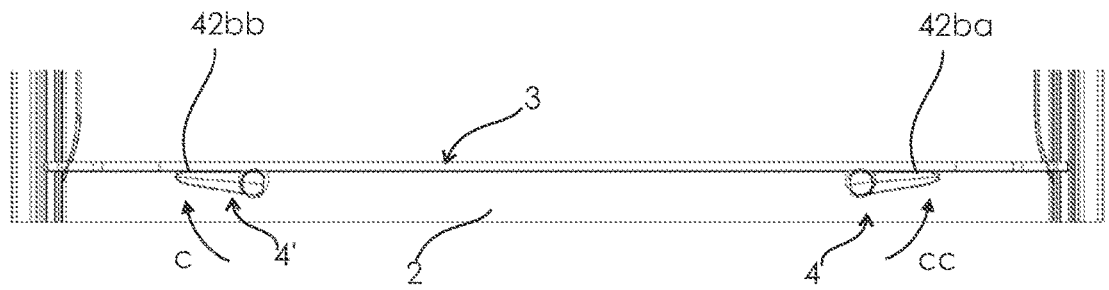
FIGS. 12A-C each shows a part of furniture product comprising two panels and an embodiment of the locking device configured in locking position, according to an embodiment.
Figure 12B:
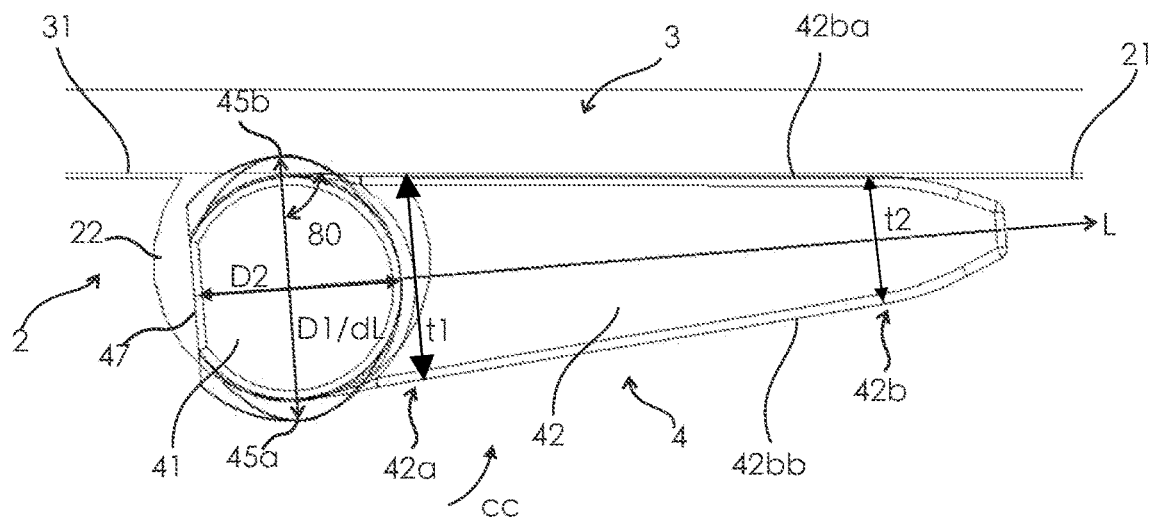
Figure 12C:
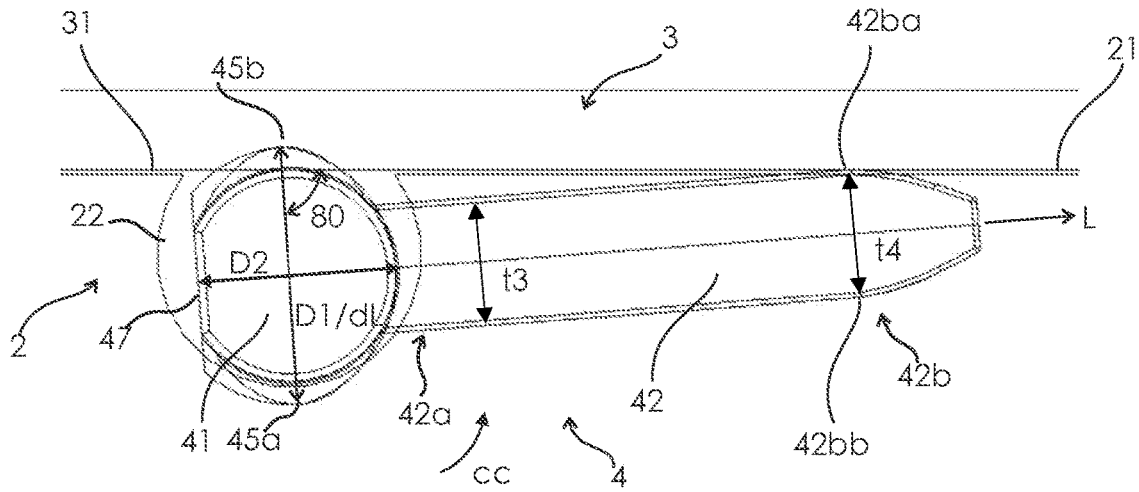

FIGS. 12B-12C each show an embodiment of the locking device 4 which is configured to lock the first edge of the adjacent panel 3 in the groove 21 of the panel 2. The locking device 4 comprises a cylinder 41 and a lever 42 connected to the cylinder 41, wherein the cylinder 41 is configured to be arranged in the hole 22 in the panel 2, wherein the cylinder is configured to be displaceable in said hole 22 between a mounting position and a locking position by means of rotation cc of said cylinder. The cylinder 41 comprises a locking surface 45b configured to engage with the adjacent panel by means of a rotation of said cylinder 41 for locking the adjacent panel to the panel. The cylinder 41 comprises a mounting surface 47 configured to be arranged in said mounting position adjacent and/or facing the opening between the groove and the hole.

The mounting surface 47 may be an essentially planar surface.

The cylinder comprises a first width D1 and a second width D2 in a plane transverse a longitudinal centre axis of the cylinder, wherein the first width D1 being parallel the mounting surface 47 and a second width D2 transverse the mounting surface 47. The first width D1 is greater than the second width D2 and the second width D2 is configured to be perpendicular to the first edge 31 in the mounting position.

The first width D1 may be configured to be at a locking angle 80 to the first edge 31 in the locking position, wherein the locking angle 80 may be within the range of about 80° to about 100° or about 85° to about 105, or about 90°.

The locking surface 45b may be configured to engage with the adjacent panel 3 by means of a counter-clockwise rotation cc of the cylinder 41 for the locking of the adjacent panel 3 to the panel 2.

The locking angle 80 may be within the range of about 80° to about 89° or about 82° to about 87°, or about 85° for the counter-clockwise rotation cc of the cylinder 41.

The cylinder 41 may comprise, opposite the locking surface 45b, an opposite locking surface 45a configured to engage with the adjacent panel 3 by means of a clockwise rotation c of said cylinder 4 for locking the adjacent panel 3 to the panel 2.

The locking angle 80 may be within the range of about 91° to about 100° or about 93° to about 97°, or about 95° for the clockwise rotation c of the cylinder 41.

A longitudinal direction L of the lever 42 may be perpendicular to the mounting surface 47.

The locking device 4 may be configured to be rotated past a position in which the first width D1 is perpendicular to the first edge 31 and to the locking position. The lever 42 comprises a lever locking surface 42ba, preferably on the outer end 42b of the lever 42, wherein the lever locking surface is configured to cooperate with the adjacent panel 3 in the locking position. An advantage with this embodiment may be that the lever locking surface counteracts rotation in one direction and the position of the first width D1 counteracts rotation in the opposite direction.

The lever locking surface 42ba may be configured to cooperate with the adjacent panel 3 in the locking position by means of a counter-clockwise rotation cc of the cylinder 41.

The lever 42 may comprise, opposite the lever locking surface 42bb, preferably on the outer end 42b of the lever 42, an opposite lever locking surface 42ba. The opposite lever locking surface may be configured to cooperate with the adjacent panel 3 in the locking position.

The opposite lever locking surface 42bb may be configured to cooperate with the adjacent panel 3 in the locking position by means of a clockwise rotation c of the cylinder 41.

The first width D1 may be the largest diameter dL of the cylinder 4.

The lever 42 may be handle configured to be moved by a user.

The handle and the cylinder 41 may be moulded in one piece.

The embodiment of the locking device in FIG. 12B comprises an embodiment of the lever 42 which comprises a first thickness t1 at an inner end 42a and a second thickness t2 at an outer end 42b, wherein the first thickness is greater than the second thickness. An advantage may be an increased strength of the lever. The lever may be essentially wedge shaped. This embodiment of the locking device is shown in more detail in FIGS. 11A-11E.

FIG. 12A shows an embodiment which comprises two of the embodiment of the locking device 4 shown in FIG. 12B for locking the first edge of the adjacent panel 3 in the groove of the panel 2. This embodiment of the locking device 4 may be symmetric such that the locking device may be locked by rotating the locking device 4 clockwise c or counter-clockwise cc.

The embodiment of the locking device in FIG. 12C comprises an embodiment of the lever 42 which comprises a first thickness t3 at an inner end 42a and a second thickness t4 at an outer end 42b, wherein the first thickness is essentially the same as the second thickness. The lever may be essentially rectangular shaped.

In one embodiment, the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is preferably printed, for example by direct printing, rotogravure, or digital printing. In one embodiment, the decorative layer comprise melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise panels comprising a wood base core, such as HDF, MDF, plywood, particleboard, OSB or masonite.

Further embodiments of the invention are described below:

1. A set, preferably for a furniture product, comprising a panel 2, an adjacent panel 3 and a locking device 4, wherein the panel 2 comprises a groove 21 and at least one hole 22 connected to the groove 21 via an opening 23, wherein the adjacent panel 3 comprises a first edge 31 that is configured to be arranged in the groove 21 of the panel 2, wherein the locking device 4 is configured to lock the first edge 31 of the adjacent panel 3 in the groove 21 of the panel 2, wherein the locking device 4 comprises a cylinder 41 and a lever 42 connected to the cylinder 41, wherein the cylinder 41 is configured to be arranged in the hole 22 in the panel 2, and wherein the cylinder is configured to be displaceable in said hole 22 between a first mounting position and a second locking position by means of rotation of said cylinder.

2. The set according to embodiment 1, wherein the cylinder 41 comprises a first locking surface 45a configured to engage with the adjacent panel by means of a clockwise rotation of said cylinder 4 for locking the adjacent panel to the panel.

3. The set according to embodiment 1 or 2, wherein the cylinder 41 comprises a second locking surface 45b configured to engage with said adjacent panel 3 by means of a counter-clockwise rotation of said cylinder 4 for locking the adjacent panel to the panel.

4. The set according to any of embodiments 1 to 3, wherein the locking device 4 comprises a plane S, preferably being a plane of symmetry, wherein the first locking surface 45a is provided on a first side of said plane S and the second locking surface 45b is provided on an opposite second side of said plane S.

5. The set according to any of embodiments 1 to 5, wherein the cylinder comprises an essentially planar surface 47 configured to be arranged adjacent and/or facing the opening 23 in said first mounting position, preferably said planar surface 47 is orthogonal the plane S and a bottom base 44 of the locking device, and preferably a longitudinal direction of the lever (42) is perpendicular to the essentially planar surface (47).

6. The set according to any one of the preceding embodiments 1 to 5, wherein each locking surface 45a, 45b comprises at least two ridges 46 protruding in a radial direction from the cylinder 41.

7. The set according to any one of the preceding embodiments 1 to 6, wherein the lever 42 extends from an inner end 42a to an outer end 42b in a direction substantially transverse the planar surface 47.

8. The set according to any one of the preceding embodiments 3 to 7, wherein the plane S is configured to be arranged substantially orthogonal the adjacent panel 3 and the panel 2 in the mounting position.

9. The set according to any one of embodiments 4 to 8, wherein the plane S is a centre plane of the locking device 4.

10. The set according any one of the preceding embodiments 4 to 9, wherein the plane S is orthogonal the planar surface 47 and a bottom base 44 of the cylinder 41.

11. The set according to any one of the preceding embodiments 1 to 10, wherein the cylinder 41 comprises at least one cross-section portion parallel the planar surface 47 being configured to lock the first edge 31 of the adjacent panel 3 in the groove 21 by means of any of a clockwise rotation of the cylinder 41 and a counter-clockwise rotation of the cylinder 41 initiated in the mounting position.

12. The set according to any one of the preceding embodiments 1 to 11, wherein the hole 22 and the first edge 31 forms a D-shape when the first edge 31 is configured in said groove 21.

13. The set according to any one of the preceding embodiments 1 to 12, wherein the cylinder comprises a first width D1 and a second width D2 in a plane transverse a longitudinal centre axis X of the cylinder, the first width D1 being parallel the planar surface and a second width D2 transverse the planar surface 47.

14. The set according to the preceding embodiment 13, wherein the first width of the cylinder D1 is equal or less than the first width of the hole dH and exceeds a sum of the first width of the hole dH—height h of a circular segment 25 of hole 22 by which the hole 22 extends into the groove 21.

15. The set according to any one of the preceding embodiments 6 to 14, wherein said ridges 46 extend discontinuously along a circumference of the cylinder 41.

16. The set according to any one of the preceding embodiments 6 to 15, wherein said ridges 46 are essentially non-helical or non-helical.

17. The set according to any one of the preceding embodiments 6 to 16, wherein one or more of said ridges, preferably a most distal ridge 46c, extend directly contiguous with said planar surface 47 such that said planar surface 47 is at least partially formed in at least one of said ridges 46.

18. The set according to any one of the preceding embodiments 6 to 17, wherein one or more of said ridges 46 are separated said planar surface 47 along a circumference of the cylinder 41 such that said planar surface 47 is not formed said ridges 46a, 46b.

19. The set according to any one of the preceding embodiments 1 to 18, wherein at least a portion of an inner circumferential surface of the cylinder 41 extending from the planar surface 47, or between the planar surfaces, comprises a constant radius R1.

20. The set according to any one of the preceding embodiments 1 to 19, wherein the locking device 4 is configured to obtain said mounting position by means of arranging said planar surface facing said adjacent panel 3.

21. The set according to any one of the preceding embodiments 1 to 20, wherein the locking device 4 is configured to obtain said mounting position by means of displacement of the cylinder 41 along its longitudinal axis X into said hole 22 while not rotating the cylinder 41.

22. The set according to any one of the preceding embodiments 1 to 21, wherein the planar surface 47 and the circumference of the cylinder comprising a constant radius R1 forms a single D cross-section.

23. The set according to any one of the preceding embodiments 1 to 22, wherein the planar surface 47 and the adjacent panel forms a vertical plane VP in the mounting position.

24. The set according to any one of the preceding embodiments 1 to 23, wherein said cylinder 41 is configured such that, the extension of the cylinder in a direction transverse the opening 23 is increased in response to rotation of the cylinder 41 initiated in said mounting position.

25. The set according to any one of the preceding embodiments 1 to 24, wherein the adjacent panel 3 and the hole 22, such as an inner wall of the hole 22, forms a D-shaped cross-section.

26. The set according to any one of the preceding embodiments 1 to 25, wherein a most distal and/or bottom ridge 46c comprises a greater volume than one or more proximal ridges 46a, 46b.

27. The set according to any one of the preceding embodiments 1 to 26, wherein a first distance y1, measured along a centre axis X of the cylinder 41, between a most distal and/or bottom ridge 46c and a proximal neighbouring ridge 46b is smaller than a second distance y2 between two proximal ridges 46b, 46c.

28. The set according to any one of the preceding embodiments 1 to 27, wherein portions of the cylinder 41 are non-eccentric or comprise a constant radius R1.

29. The set according to any one of the preceding embodiments 1 to 27, wherein the lever 42 comprises a first locking surface 42ba and a second locking surface 42bb, preferably on the outer end 42b of the lever 42, wherein the first and second locking surfaces are configured such that it abuts the adjacent panel 3 in the first and second locking positions respectively, preferably such that the locking device is stopped during a rotation at a position where the ridges cut in deepest into the adjacent panel 3.

30. Method for assembly of a set of panels, such as a set according to any one of claims 1 to 29, the method comprising: inserting a first edge 31 of the adjacent panel 3 into a groove 21 of a panel 2; inserting a cylinder 41 of a first of said locking device 4 into a first of said hole 22 of the panel 2 to a mounting position; turning a lever 42 of the first of said locking device 4 in a first locking direction, such as a clockwise direction c, to move the locking device 4 from the mounting position to a locking position to lock the first edge 31 of the adjacent panel 3 in the groove 21.

31. The method according to the previous embodiment 30, further comprising: inserting a the cylinder 41 of a second of said locking device 4' into a second of said hole 22' of the panel 2 or the further panel to a mounting position; turning the lever 42 of the second of said locking device 4' in a second locking direction being opposite the first locking direction, such as a counter-clockwise direction cc, to move the second of said locking device 4' from the mounting position to a locking position to lock the first edge 31 of the adjacent panel 3 in the groove 21 of the panel 2.

32. The method according to the previous embodiment 31, wherein, in the locking position, the respective levers of the first and the second of said locking device 4, 4' extend from the respective cylinders in opposite directions.

33. A set, preferably for a furniture product, comprising a panel 2, an adjacent panel 3 and at least two locking devices 4, 4', wherein the panel 2 comprises a groove 21 and at least two holes 22, 22' connected to the groove 21 via respective openings 23, wherein the adjacent panel 3 comprises a first edge 31 that is configured to be arranged in the groove 21 of the panel 2, wherein each of the locking devices 4, 4' is configured to lock the first edge 31 of the adjacent panel 3 in the groove 21 of the panel 2, wherein each locking device 4, 4' comprises a cylinder 41 and a lever 42 connected to the cylinder 41, wherein the cylinders 41 of the respective locking devices 4, 4' are configured to be arranged in the respective holes 22, 22' in the panel 2, wherein the cylinders are configured to be displaceable in said holes 22, 22 between a first mounting position and a second locking position by means of rotation of said cylinders, to lock the first edge 31 of the adjacent panel 3 in the groove 21 of the panel 2, and wherein the locking devices 4, 4' are configured such that the adjacent panel 3 is locked to the panel 2 by means of rotating the respective locking devices 4, 4' in opposite directions or rotating one of the locking devices 4,4' a positive rotation (counter-clockwise) and the other of the locking devices 4' in a negative rotation (clockwise).

The invention claimed is:

1. A set comprising a panel, an adjacent panel and a locking device, wherein the panel comprises a groove and at least one hole connected to the groove via an opening, wherein the adjacent panel comprises a first edge which is configured to be arranged in the groove of the panel, wherein the locking device is configured to lock the first edge of the adjacent panel in the groove of the panel, wherein the locking device comprises a cylinder and a lever connected to the cylinder, wherein the cylinder is configured to be arranged in the hole in the panel, wherein the cylinder is configured to be displaceable in said hole between a mounting position and a locking position by means of rotation of said cylinder, wherein the cylinder comprises a first locking surface configured to engage with the adjacent panel by means of a clockwise rotation of said cylinder for locking the adjacent panel to the panel, wherein the cylinder comprises, opposite the first locking surface, a second locking surface configured to engage with said adjacent panel by means of a counter-clockwise rotation of said cylinder for locking the adjacent panel to the panel, wherein the locking device comprises a plane, wherein the first locking surface is provided on a first side of said plane and the second locking surface is provided on an opposite second side of said plane, wherein the cylinder comprises an essentially planar surface configured to be arranged adjacent and/or facing the opening in said mounting position, wherein said planar surface is orthogonal to the plane and a bottom base of the locking device, and wherein a longitudinal direction of the lever is perpendicular to the essentially planar surface.

2. The set according to claim 1, wherein the cylinder comprises a first width and a second width in a plane transverse to a longitudinal centre axis of the cylinder, wherein the first width is parallel to the planar surface and the second width is transverse to the planar surface, wherein the first width is greater than the second width.

3. The set according to claim 2, wherein the second width is configured to be perpendicular to the first edge in the mounting position.

4. The set according to claim 2, wherein the first width is the largest diameter of the cylinder.

5. The set according to claim 4, wherein the handle and the cylinder are moulded in one piece.

6. The set according to claim 2, wherein the first width is configured to be at a locking angle to the first edge in the locking position, wherein the locking angle is within the range of about 80° to about 100° or about 85° to about 105°.

7. The set according to claim 2, wherein the locking device is configured to be rotated past a position in which the first width is perpendicular to the first edge and to the locking position.

8. The set according to claim 1, wherein the plane is a centre plane of the locking device.

9. The set according to claim 1, wherein the lever is a handle configured to be moved by a user.

10. The set according to claim 1, wherein each locking surface comprises at least two ridges protruding in a radial direction from the cylinder.

11. The set according to claim 10, wherein said ridges extend discontinuously along a circumference of the cylinder.

12. The set according to claim 10, wherein said ridges are essentially non-helical or non-helical.

13. The set according to claim 10, wherein a most distal bottom ridge comprises a greater volume than one or more proximal ridges.

14. The set according to claim 10, wherein a distance, measured along a centre axis of the cylinder, between a most distal bottom ridge and a proximal neighbouring ridge is smaller than a distance between two proximal ridges.

15. The set according to claim 1, wherein the first and second locking surfaces are symmetric about the plane.

16. A set comprising a panel, an adjacent panel and a locking device, wherein the panel comprises a groove and at least one hole connected to the groove via an opening, wherein the adjacent panel comprises a first edge which is configured to be arranged in the groove of the panel, wherein the locking device is configured to lock the first edge of the adjacent panel in the groove of the panel, wherein the locking device comprises a cylinder and a lever connected to the cylinder, wherein the cylinder is configured to be arranged in the hole in the panel, wherein the cylinder is configured to be displaceable in said hole between a mounting position and a locking position by means of rotation of said cylinder, wherein the cylinder comprises a locking surface configured to engage with the adjacent panel by means of a rotation of said cylinder for locking the adjacent panel to the panel, wherein the cylinder comprises a mounting surface configured to be arranged adjacent and/or facing the opening in said mounting position, wherein the cylinder comprises a first width and a second width in a plane transverse to a longitudinal centre axis of the cylinder, wherein the first width is parallel to the mounting surface and the second width is transverse to the mounting surface, wherein the first width is greater than the second width, wherein the second width is configured to be perpendicular to the first edge in the mounting position, wherein the locking device is configured to be rotated past a position in which the first width is perpendicular to the first edge and to the locking position, and wherein the lever comprises a lever locking surface, wherein the lever locking surface is configured to cooperate with the adjacent panel in the locking position.

17. The set according to claim 16, wherein the first width is the largest diameter of the cylinder.

18. The set according to claim 16, wherein the lever is a handle configured to be moved by a user.

19. The set according to claim 18, wherein the handle and the cylinder are moulded in one piece.

20. The set according to claim 16, wherein the locking surface is configured to engage with the adjacent panel by means of a counter-clockwise rotation of the cylinder for the locking of the adjacent panel to the panel.

21. The set according to claim 20, wherein the first width is configured to be at a locking angle to the first edge in the locking position, wherein the locking angle is within the range of about 80° to about 89 for the counter-clockwise rotation of the cylinder.

22. The set according to claim 16, wherein the lever locking surface is configured to cooperate with the adjacent panel in the locking position by means of a counter-clockwise rotation of the cylinder.

23. The set according to claim 16, wherein the cylinder comprises, opposite the first locking surface, an opposite locking surface configured to engage with the adjacent panel by means of a clockwise rotation of said cylinder for locking the adjacent panel to the panel.

24. The set according to claim 23, wherein the first width is configured to be at a locking angle to the first edge in the locking position, wherein the locking angle may be within the range of about 91° to about 100° for the clockwise rotation of the cylinder.

25. The set according to claim 16, wherein the lever comprises, opposite the lever locking surface, an opposite lever locking surface, wherein the opposite lever locking surface is configured to cooperate with the adjacent panel in the locking position by means of a clockwise rotation of the cylinder.

26. The set according to claim 16, wherein a longitudinal direction of the lever is perpendicular to the mounting surface.

27. The set according to claim 16, wherein the mounting surface is an essentially planar surface.

28. The set according to claim 16, wherein the lever is symmetric about the plane.

* * * * *